United States Patent [19]

Sheehan et al.

[11] Patent Number: 5,504,979
[45] Date of Patent: Apr. 9, 1996

[54] PROCESS FOR FORMING FIBROUS PREFORM STRUCTURES

[75] Inventors: Philip W. Sheehan, Pueblo West; Ronnie S. Liew, Pueblo, both of Colo.

[73] Assignee: The BFGoodrich Company, Akron, Ohio

[21] Appl. No.: 487,817

[22] Filed: Jun. 7, 1995

Related U.S. Application Data

[62] Division of Ser. No. 279,608, Jul. 25, 1994.

[51] Int. Cl.$^6$ .............................. B32B 5/06; D04H 1/46; D04H 3/10; D04H 5/02
[52] U.S. Cl. .................................. 28/43; 28/111; 28/107
[58] Field of Search ......................................... 28/107–114

[56] References Cited

U.S. PATENT DOCUMENTS

| | | | |
|---|---|---|---|
| 2,930,100 | 3/1960 | Rust, Jr. ......................................... | 28/4 |
| 3,090,101 | 5/1963 | Chagnon et al. ........................ | 28/72.2 |
| 3,657,061 | 4/1972 | Carlson et al. ........................... | 161/81 |
| 3,772,115 | 11/1973 | Carlson et al. .......................... | 156/148 |
| 3,994,762 | 11/1976 | Wzeslen et al. ......................... | 156/178 |
| 4,284,680 | 8/1981 | Awano et al. ............................. | 428/234 |
| 4,621,662 | 11/1986 | Pierre Olry ............................. | 138/129 |
| 4,780,363 | 10/1988 | Evans et al. ............................. | 428/300 |
| 4,790,052 | 12/1988 | Pierre Olry ................................. | 28/110 |
| 4,955,123 | 9/1990 | Lawton et al. .......................... | 29/419.1 |
| 5,081,754 | 1/1992 | Lawton et al. .......................... | 29/419.1 |
| 5,113,568 | 5/1992 | Lawton et al. .......................... | 29/419.1 |
| 5,184,387 | 2/1993 | Lawton et al. .......................... | 29/419.1 |
| 5,217,770 | 6/1993 | Morris, Jr. et al. ..................... | 428/36.3 |
| 5,226,217 | 7/1993 | Pierre Olry ............................... | 28/107 |
| 5,323,523 | 6/1994 | Lawton et al. .......................... | 29/419.1 |
| 5,388,320 | 2/1995 | Smith et al. ............................. | 29/419.1 |

FOREIGN PATENT DOCUMENTS

| | | |
|---|---|---|
| 0530741 | 3/1993 | European Pat. Off. . |
| 1308999 | 3/1973 | United Kingdom . |
| 2012671 | 8/1979 | United Kingdom . |
| 1549687 | 8/1979 | United Kingdom . |
| 2099365 | 12/1982 | United Kingdom . |
| 2230491 | 10/1990 | United Kingdom . |
| 2271155 | 4/1994 | United Kingdom . |
| 9101397 | 2/1991 | WIPO . |
| 9204492 | 3/1992 | WIPO . |

OTHER PUBLICATIONS

A Study of Needled Fabrics, Part 1: Experimental Methods and Properties, by J. W. S. Hearle, M. A. I. Sulton, Journal of the Textile Institute, vol. 58, 1967, pp. 251–265.

A Study of Needled Fabrics, Part II: Effects of the Needling Process, by J. W. S. Hearle M. A. I. Sulton and T. N. Choudhari, Journal of the Textile Institute, vol. 103, 1968, pp. 102–116.

A Study of Needle Fabrics, Part VII: The Transfer of Fibres Through The Web By Needling, by J. S. S. Hearle and T. N. Choudhari, Journal of the Textile Institute, vol. 60, 1969, pp. 478–496.

A Study of Needle Action During Needle–Punching, J. W. S. Hearle, At. T. Purdy, and J. T. Jones, Journal of The Textile Institute, vol. 64, 1973, pp. 617–623.

A Study of Needle Action During Needle–Punching, G. Barrett, Journal of The Textile Institute, vol. 65, 1974, p. 226.

(List continued on next page.)

*Primary Examiner*—John J. Calvert
*Attorney, Agent, or Firm*—Kevin L. Leffel

[57] ABSTRACT

The invention relates to the field of needling processes for forming fibrous preform structures. The invention is particularly useful in forming fibrous preform structures suitable for subsequent processing into high temperature resistant composite structures such as carbon/carbon aircraft brake disks. The process according to the invention compensates for fiber pull back induced by fiber resilience, and for compaction in previously needled layers induced during subsequent needling passes. According to a further aspect of the invention, Z-fiber distribution throughout the thickness of the fibrous preform structure may be manipulated as necessary to achieve a desired distribution.

4 Claims, 20 Drawing Sheets

OTHER PUBLICATIONS

A Study of Needle Action During Needle Punching, A. T. Purdy, Journal of The Textile Institute, vol. 65, 1974, p. 227.

Rakshit, Desai, Balasubramanian, Engineering needle punched nonwovens to meet functional properties, vol. 20, Issue 4, pp. 20–24, 1989.

Nencini, Computer assisted quality assurance on needling machines, International Nonwovens Bulletin, p. 41, 1992.

Yokota, Takahashi, Kawafune, Measurement of needle punch density in dynamic state and applicaton to process control, Objective Measurement, 9 6–7, 1985, pp. 599–603.

Subramaniam, Madsoothnanan, Debnath, A study of the needle–punched non–woven fabrics using factorial design technique, pp. 124–132, Feb. 1990.

Voigtlander, Studies on the needle process: Influence of stick density and needle penetration on quality–related properties and needle–punching effectiveness, Melliand Textilberichte, vol. 5, 1992, pp. 391–396.

Ptacek, Pavlik, Determining felting needle penetration depth, Wool Industry Reserach Institute, Textilbetreib, Jul./Aug. 1982, pp. 26–29.

| NEEDLING PASS | LAYER NUMBER | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| 1 | 100 | 100 | | | | | | | | | | | | |
| 2 | 100 | 100 | 100 | | | | | | | | | | | |
| 3 | 95 | 100 | 100 | 100 | | | | | | | | | | |
| 4 | 25 | 95 | 100 | 100 | 100 | | | | | | | | | |
| 5 | – | 25 | 95 | 100 | 100 | 100 | | | | | | | | |
| 6 | 0.6 | – | 70 | 95 | 100 | 100 | 100 | | | | | | | |
| 7 | 0.6 | – | – | 25 | 95 | 100 | 100 | 100 | | | | | | |
| 8 | | – | – | – | 25 | 95 | 100 | 100 | 100 | | | | | |
| 9 | | 0.2 | – | – | – | – | 70 | 100 | 100 | 100 | | | | |
| 10 | | | | 0.9 | – | – | – | 70 | 95 | 100 | 100 | | | |
| 11 | | | | | 0.8 | – | – | – | 70 | 95 | 100 | 100 | | |
| 12 | | | | | | 0.9 | – | – | – | 70 | 95 | 100 | 100 | |
| 13 | | | | | | | 0.3 | – | – | – | – | 70 | 95 | 100 |
| 14 | | | | | | | | 0.9 | – | – | – | 70 | 95 | 100 |
| 15 | | | | | | | | | 0.2 | – | – | – | – | 70 |
| 16 | | | | | | | | | | 0.4 | – | – | – | – |
| 17 | | | | | | | | | | | 0.3 | – | – | – |
| 18 | | | | | | | | | | | | 0.2 | – | – |
| 19 | | | | | | | | | | | | | 0.3 | – |
| 20 | | | | | | | | | | | | | | 0.2 |
| 21 | | | | | | | | | | | | | | |
| 22 | | | | WS=420 | | | | | | | | | | |
| 23 | | | | | | | | | | | | | | |
| 24 | | | | | | | | | | | | | | |
| 25 | | | | | | | | | | | | | | |
| 26 | | | | | | | | | | | | | | |
| 27 | | | | | | | | | | | | | | |
| 28 | | | | | | | | | | | | | | |
| 29 | | | | | | | | | | | | | | |
| 30 | | | | | | | | | | | | | | |
| 31 | | | | | | | | | | | | | | |
| W01 | | | | | | | | | | | | | | |
| W02 | | | | | | | | | | | | | | |
| W03 | | | | | | | | | | | | | | |
| ACTUAL CQT | 320 | 420 | 465 | 420 | 420 | 395 | 370 | 370 | 365 | 365 | 295 | 340 | 290 | 270 |
| DESIRED CQT | 440 | 490 | 465 | 395 | 370 | 370 | 370 | 370 | 365 | 320 | 320 | 320 | 295 | 270 |

| | | | | | | | | | | | | | | | | | | |
|---|---|---|---|---|---|---|---|---|---|---|---|---|---|---|---|---|---|---|
| LAYER NUMBER | | | | | | | | | | | | | | | | | | |
| | 15 | 16 | 17 | 18 | 19 | 20 | 21 | 22 | 23 | 24 | 25 | 26 | 27 | 28 | 29 | 30 | 31 | 32 |
| | | | | | | | | | | | | | | WS=220 | | | | |
| | 100 | | | | | | | | | | | | | | | | | |
| | 95 | 100 | | | | | | | | | | | | | | | | |
| | 70 | 100 | 100 | | | | | | | | | | | | | | | |
| | – | 70 | 100 | 100 | | | | | | | | | | | | | | |
| | – | – | 70 | 95 | 100 | | | | | | | | | | | | | |
| | – | – | – | 70 | 100 | 100 | | | | | | | | | | | | |
| | – | – | – | – | 70 | 95 | 100 | | | | | | | | | | | |
| | – | – | – | – | – | 70 | 95 | 100 | | | | | | | | | | |
| | | | 0.7 | – | – | – | 25 | 95 | 100 | | | | | | | | | |
| | | | | 0.7 | – | – | – | 25 | 95 | 100 | | | | | | | | |
| | | | | | 0.7 | – | – | – | 25 | 95 | 100 | | | | | | | |
| | | | | | | – | – | – | 70 | 95 | 100 | | | | | | | |
| | | | | | | 0.6 | – | – | – | 25 | 95 | 100 | | | | | | |
| | | | | | | | – | – | – | 70 | 95 | 100 | | | | | | |
| | | | | | | | 0.7 | – | – | – | 25 | 95 | 100 | | | | | |
| | | | | | | | | 0.7 | – | – | – | 25 | 95 | 100 | | | | |
| | | | | | | | | | 0.7 | – | – | – | 25 | 95 | 100 | | | |
| | | | | | | | | | | 0.7 | – | – | – | 25 | 95 | 100 | 100 | |
| | | | | | | | | | | | 0.5 | – | – | – | 25 | 100 | | |
| | 265 | 270 | 270 | 265 | 270 | 265 | 220 | 220 | 220 | 265 | 220 | 265 | 220 | 220 | 245 | 290 | 225 | 200 |
| | 270 | 270 | 270 | 265 | 265 | 265 | 225 | 220 | 220 | 220 | 265 | 265 | 195 | 220 | 290 | 225 | 200 | 200 |

| $\delta$ (MM) | $\delta^i-\delta^{i-1}$ (MM) | T (MM) | $t_{air}$ (MM) | $t_{ave}$ (MM) | F (MM) | ACTUAL $D1_1$ (MM) | DESIRED $D1_1$ (MM) |
|---|---|---|---|---|---|---|---|
| 0.0 | – | 8.38 | 5.84 | 2.54 | 2.0 | 14.62 | – |
| 0.2 | 0.2 | 9.65 | 4.83 | 2.41 | 1.0 | 14.69 | 16.96 |
| 1.5 | 1.3 | 9.91 | 4.32 | 1.86 | 1.0 | 13.65 | 15.80 |
| 2.0 | 0.5 | 11.18 | 3.56 | 1.91 | 1.0 | 14.42 | 15.01 |
| 3.8 | 1.8 | 12.07 | 3.56 | 1.70 | 1.0 | 13.51 | 14.53 |
| 4.9 | 1.1 | 13.34 | 3.56 | 1.63 | 1.0 | 13.68 | 14.11 |
| 6.8 | 1.9 | 14.61 | 3.56 | 1.58 | 1.0 | 13.05 | 13.41 |
| 8.4 | 1.6 | 16.00 | 3.56 | 1.56 | 0.9 | 12.74 | 13.03 |
| 9.9 | 1.5 | 17.27 | 3.56 | 1.52 | 0.9 | 12.51 | 12.80 |
| 11.6 | 1.7 | 18.42 | 3.30 | 1.51 | 0.9 | 11.96 | 12.33 |
| 13.2 | 1.6 | 19.56 | 3.30 | 1.48 | 0.9 | 11.50 | 11.87 |
| 14.6 | 1.4 | 21.34 | 3.30 | 1.50 | 0.9 | 11.88 | 11.58 |
| 16.6 | 2.0 | 21.97 | 3.30 | 1.44 | 0.9 | 10.51 | 11.38 |
| 17.4 | 0.8 | 24.00 | 3.30 | 1.48 | 0.9 | 11.74 | 11.15 |
| 19.7 | 2.3 | 25.02 | 3.30 | 1.45 | 0.9 | 10.46 | 10.92 |
| 21.0 | 1.3 | 26.54 | 3.30 | 1.45 | 0.9 | 10.68 | 10.61 |
| 22.5 | 1.5 | 27.94 | 3.30 | 1.45 | 0.9 | 10.58 | 10.63 |
| 24.0 | 1.5 | 29.34 | 3.30 | 1.45 | 0.9 | 10.48 | 10.53 |
| 25.4 | 1.4 | 30.99 | 3.30 | 1.46 | 0.9 | 10.73 | 10.53 |
| 27.2 | 1.8 | 32.51 | 3.30 | 1.46 | 0.9 | 10.45 | 10.39 |
| 28.9 | 1.7 | 34.04 | 3.30 | 1.46 | 0.9 | 10.28 | 10.21 |
| 30.8 | 1.9 | 35.56 | 3.30 | 1.47 | 0.9 | 9.90 | 9.84 |
| 32.4 | 1.6 | 37.08 | 3.30 | 1.47 | 0.9 | 9.82 | 9.77 |
| 33.9 | 1.5 | 38.61 | 3.30 | 1.47 | 0.9 | 9.85 | 9.79 |
| 35.1 | 1.2 | 40.51 | 3.30 | 1.49 | 0.9 | 10.55 | 10.12 |
| 37.0 | 1.9 | 41.66 | 3.30 | 1.48 | 0.9 | 9.80 | 10.14 |
| 38.2 | 1.2 | 43.43 | 3.30 | 1.49 | 0.9 | 10.37 | 10.08 |
| 39.9 | 1.7 | 44.70 | 3.30 | 1.48 | 0.9 | 9.94 | 10.16 |
| 41.3 | 1.4 | 46.10 | 3.30 | 1.48 | 0.9 | 9.94 | 10.02 |
| 43.0 | 1.7 | 47.75 | 3.30 | 1.48 | 0.9 | 9.89 | 9.72 |
| 44.6 | 1.6 | 50.81 | 3.10 | 1.48 | 2.6 | 13.05 | |
| 46.2 | 1.6 | 50.65 | 2.95 | 1.48 | 0.9 | 9.59 | |
| 47.8 | 1.6 | 49.93 | 2.18 | 1.48 | – | 6.37 | |
| 49.4 | 1.6 | 49.86 | 2.11 | 1.48 | – | 4.70 | |

FIG-11C

|  | LAYER NUMBER | | | | | | | | | | | | |
|---|---|---|---|---|---|---|---|---|---|---|---|---|---|
| NEEDLING PASS | 1 | 2 | 3 | 4 | 5 | 6 | 7 | 8 | 9 | 10 | 11 | 12 | 13 |
| 1 | 70 | 100 | | | | | | | | | | | |
| 2 | 100 | 100 | 100 | | | | | | | | | | |
| 3 | – | 70 | 100 | 100 | | | | | | | | | |
| 4 | – | – | 70 | 100 | 100 | | | | | | | | |
| 5 | 0.49 | – | – | 70 | 100 | 100 | | | | | | | |
| 6 | | 0.66 | – | – | 70 | 100 | 100 | | | | | | |
| 7 | | | 0.83 | – | – | 70 | 100 | 100 | | | | | |
| 8 | | | | 0.80 | – | – | 100 | 95 | 100 | | | | |
| 9 | | | | | 0.12 | – | – | – | 70 | 100 | 100 | | |
| 10 | | | | | | 0.18 | – | – | – | 70 | 100 | 100 | |
| 11 | | | | | | | 0.09 | – | – | – | 70 | 95 | 100 |
| 12 | | | | | | | | 0.53 | – | – | – | 70 | 100 | 100 |
| ACTUAL CQT | 170 | 270 | 270 | 270 | 270 | 270 | 270 | 265 | 270 | 270 | 265 | 200 | 100 · · |
| DESIRED CQT | 270 | 270 | 270 | 270 | 270 | 270 | 270 | 270 | 270 | 270 | 270 | 270 | 270 · · |

FIG–13A

| $\delta$ (MM) | $\delta^i-\delta^{i-1}$ (MM) | T (MM) | $t_{ave}$ (MM) | F (MM) | DESIRED $D3_1$ (MM) | ACTUAL $D3_1$ (MM) | DESIRED $D1_1$ (MM) | ACTUAL $D1_1$ (MM) |
|---|---|---|---|---|---|---|---|---|
| 0.0 | – | 6.48 | 3.24 | 0 | – | – | – | 11.12 |
| −1.2 | −1.2 | 7.87 | 2.62 | 0.9 | 9.12 | 9.37 | 15.60 | 14.61 |
| 3.0 | 4.2 | 8.89 | 2.72 | 0.9 | 7.80 | 7.00 | 13.04 | 11.93 |
| 4.7 | 1.7 | 10.92 | 2.18 | 0.9 | 7.50 | 7.40 | 11.94 | 11.76 |
| 6.6 | 1.9 | 12.70 | 2.12 | 0.9 | 7.50 | 7.40 | 11.86 | 11.64 |
| 8.2 | 1.6 | 13.97 | 2.00 | 0.9 | 8.00 | 7.31 | 12.24 | 11.31 |
| 9.8 | 1.6 | 15.75 | 1.97 | 0.9 | 7.75 | 7.54 | 11.75 | 11.48 |
| 11.6 | 1.8 | 17.02 | 1.89 | 0.9 | 7.75 | 7.18 | 11.69 | 10.96 |
| 12.7 | 1.1 | 18.42 | 1.84 | 0.9 | 8.00 | 7.58 | 11.78 | 11.26 |
| 14.3 | 1.6 | 19.94 | 1.81 | 0.9 | 7.80 | 7.56 | 11.48 | 11.18 |
| 15.9 | 1.6 | 21.08 | 1.76 | 0.9 | 7.80 | 7.20 | 11.42 | 10.72 |
| 16.9 | 1.0 | 22.86 | 1.76 | 0.9 | 8.00 | 7.98 | 11.52 | 11.50 |

FIG-13B

| NEEDLING PASS 2 | | | |
|---|---|---|---|
| LAYER | N | DESIRED QUANTITY | DEPTH (MM) |
| 3 | 1 | 100 | 3.24 |
| 2 | 2 | 100 | 3.24 |
| 1 | 3 | 100 | 9.12 |
| | | $D1_1^2$ | 15.60 |

FIG-14A

| NEEDLING PASS 3 | | | |
|---|---|---|---|
| LAYER | N | DESIRED QUANTITY | DEPTH (MM) |
| 4 | 1 | 100 | 2.62 |
| 3 | 2 | 100 | 2.62 |
| 2 | 3 | 70 | 7.80 |
| | | $D1_1^3$ | 13.04 |

FIG-14B

| NEEDLING PASS 4 | | | |
|---|---|---|---|
| LAYER | N | DESIRED QUANTITY | DEPTH (MM) |
| 5 | 1 | 100 | 2.22 |
| 4 | 2 | 100 | 2.22 |
| 3 | 3 | 70 | 7.50 |
| | | $D1_1^4$ | 11.94 |

FIG-14C

PROCESS FOR FORMING FIBROUS PREFORM STRUCTURES

This application is a division of Ser. No. 279,608 dated Jul. 25, 1994.

BACKGROUND OF THE INVENTION

The invention relates to the field of needling processes for forming fibrous preform structures. The invention is particularly useful in forming fibrous preform structures suitable for subsequent processing into high temperature resistant composite structures such as carbon/carbon aircraft brake disks.

Needling processes for forming fibrous preform structures for use in composite structures have been known for many years. U.S. Pat. No. 3,772,115 to Carlson et al. describes a process whereby several fibrous layers may be needled together simultaneously or in a series of needling steps. The Carlson et al. needling process involves repeatedly driving a multitude of barbed needles into the fibrous layers. The barbed needles displace fiber within the layers which causes the layers to adhere into a coherent structure. The structure may be incrementally formed by adding layers in a series of needling steps if the final structure is too thick to allow the needles to pass all the way through. The fibrous layers comprise carbon or graphite fabric, or precursors thereof. A fibrous preform structure formed according to the process may be further processed into a carbon/carbon composite structure by deposition of a carbon matrix within the fibrous preform structure that binds the fibers together. The Carlson et al. process may be used to form various composite structures, including carbon/carbon brake disks.

A similar process is disclosed in Great Britain Patent Specification 1,549,687, published Aug. 1, 1979. This also discloses a process for forming a carbon/carbon composite material. The fibrous layers may be comprised of oxidized polyacrylonitrile cloth which are needled together in a series of needling steps. In one example, the process was used to form a carbon brake disk.

A more recent process is disclosed by U.S. Pat. No. 4,790,052 to Pierre Olry. The goal is to produce a fibrous preform structure having a high degree of uniformity. This purportedly is accomplished by needling superposed layers together with a "uniform density" of needling throughout the thickness of the article. The initial depth of penetration is determined as a function of the number of layers to be traversed by the needles, for example about twenty layers. The Olry et al. process attempts to keep this depth constant throughout formation of the fibrous preform structure by lowering the fibrous structure away from the needles a distance equal to the thickness of a needled layer each time a new layer is added.

U.S. Pat. No. 4,955,123, issued Sep. 11, 1990 and PCT Publication WO 92/04492, published Mar. 19, 1992, both to Lawton et al., describe a process whereby a brake disk is formed by needling together sectors of an annulus. The fibrous structure is lowered the thickness of a needled layer each time a new layer is added.

In the fibrous preform art, the displaced fibers generated by the needling process are referred to as "Z-fibers" since they are generally perpendicular to the layers comprising a fibrous preform structure. The Z-fiber distribution throughout a brake disk can have a profound effect on disk wear life and on performance of the brake disk in slowing or stopping an aircraft. No process described thus far is sensitive to variations in the fibrous preform structure that occur during formation of the structure. Failure to account for these variations may result in a Z-fiber distribution that is significantly different from the desired Z-fiber distribution. Therefore, a needling process is desired that is sensitive to variations in the fibrous preform structure during the process whereby Z-fiber distribution throughout a brake disk may be controlled.

SUMMARY OF THE INVENTION

According to an aspect of the invention, a process is provided for forming a fibrous preform structure, comprising the steps of:

disposing a fibrous structure comprising at least two superposed fibrous layers beneath a multitude of felting needles, one of the layers being a top layer that defines an exposed surface, wherein fiber is to be transported within the fibrous structure during a needling pass in which the fibrous structure is passed beneath a multitude of felting needles while the multitude of felting needles are repeatedly driven into the fibrous structure through the exposed surface;

determining a fiber transport depth relative to the top layer necessary to achieve permanent fiber transport from a chosen set of layers without permanently transporting a significant amount of fiber from more than the chosen set of layers, the chosen set of layers including the top layer and at least one adjacent layer disposed beneath the top layer, the fiber having a tendency to pull back to a layer from which that fiber originates unless transported a minimum distance from that layer; and, transporting fiber to the desired fiber transport depth by subjecting the fibrous structure to the needling pass.

According to another aspect of the invention, a process is provided for forming a fibrous preform structure, comprising the steps of:

disposing a fibrous structure comprising at least two superposed fibrous layers beneath a multitude of felting needles, one of the layers being a top layer that defines an exposed surface, wherein fiber is to be transported within the fibrous structure during a needling pass in which the fibrous structure is passed beneath a multitude of felting needles while the multitude of felting needles are repeatedly driven into the fibrous structure through the exposed surface;

determining an estimated surface position of the exposed surface beneath the multitude of felting needles during the needling pass, wherein the exposed surface moves away from the needles during the needling pass due at least in part to compaction within the top layer;

determining a desired fiber transport depth relative to the estimated surface position; and, transporting fiber to the desired fiber transport depth by subjecting the fibrous structure to the needling pass.

According to yet another aspect of the invention, a process is provided for forming a fibrous preform structure, comprising the steps of:

disposing a fibrous structure comprising at least two superposed fibrous layers beneath a multitude of felting needles, one of the layers being a top layer that defines an exposed surface, wherein fiber is to be transported within the fibrous structure during a needling pass in which the fibrous structure is passed beneath a multitude of felting needles while the multitude of felting needles are repeatedly driven into the fibrous-structure through the exposed surface;

determining a fiber transport depth relative to the top layer necessary to permanently transport a desired quantity of fiber from each layer in a chosen set of layers, the set of layers including the top layer and at least one adjacent layer; and, transporting fiber to the desired fiber transport depth by subjecting the fibrous structure to the needling pass.

The process according to the invention is sensitive to variations in the fibrous preform structure that occur during formation of the structure, particularly compaction that occurs in previously needled layers. A desired Z-fiber distribution may thus be achieved. According to an aspect of the invention, Z-fiber distribution throughout the thickness of a brake disk may be controlled.

BRIEF DESCRIPTION OF THE DRAWINGS

FIG. 11A depicts a detailed view of the area indicated as 11A in FIG. 11.

FIG. 11B depicts a detailed view of the area indicated as 11B in FIG. 11.

FIG. 11C depicts a detailed view of the area indicated as 11C in FIG. 11.

FIG. 13A depicts a detailed view of the area indicated as 11A in FIG. 13.

FIG. 13B depicts a detailed view of the area indicated as 11B in FIG. 13.

FIG. 14A depicts a table useful for determining a desired fiber transport depth for needling pass 2 of FIG. 13.

FIG. 14B depicts a table useful for determining a desired fiber transport depth for needling pass 3 of FIG. 13.

FIG. 14C depicts a table useful for determining a desired fiber transport depth for needling pass 4 of FIG. 13.

DETAILED DESCRIPTION

The invention relates to a process for forming fibrous preform structures. Fibrous preform structures according to the invention are suitable for subsequent processing in which a binding matrix is deposited within the preform structure thus forming a composite structure. The invention is especially suited for forming fibrous preform structures suitable for subsequent processing into carbon/carbon structures such as aircraft brake disks. Subsequent processing conventionally involves pyrolyzing the preform structure (if it is formed from a precursor material), and depositing a binding carbon matrix. Depositing the carbon matrix within the preform structure may be accomplished according to known techniques such as carbon vapor infiltration and carbon vapor deposition (CVI/CVD), or by repeatedly impregnating the substrate with a carbon bearing pitch or resin which is subsequently charred, or by any equivalent process. The invention is not directed to forming the binding matrix or densification of the fibrous preform structure, as these techniques are known in the art. Though described in relation to carbon/carbon composites, it is clearly contemplated that the invention may be used with equal utility for forming fibrous preform structures suitable for subsequent processing into ceramic composite structures and carbon/ceramic composite structures.

Figure 1:
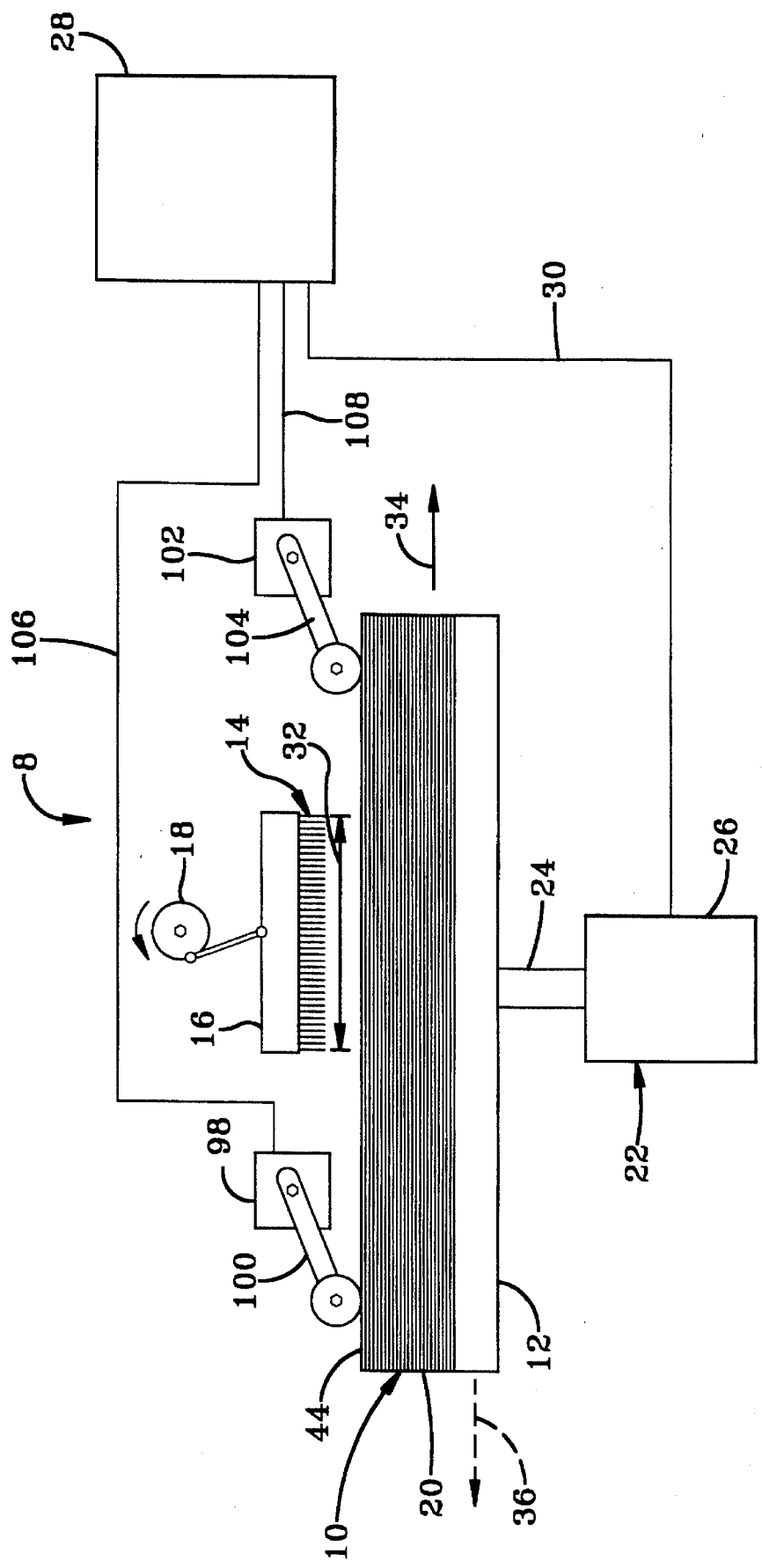
FIG. 1 depicts a general schematic arrangement of a needling apparatus suitable for use with the invention.

Various aspects of the invention are described as follows in relation to FIGS. 1 through 13 wherein like numbered components are equivalent. Referring specifically to FIG. 1, a needling apparatus 8 is schematically depicted. Apparatus 8 is suitable for forming a fibrous preform structure by cohering several fibrous layers together beginning with at least two fibrous layers to which additional fibrous layers are added in a series of needling passes, and is presented in FIG. 1 as only a general arrangement since such devices are well known in the art. Examples of apparatuses suitable for use with the invention are described in U.S. Pat. No. 4,790,052 to Olry (hereinafter the '052 patent); U.S. Pat. No. 4,955,123 to Lawton et al. (hereinafter, the '123 patent); U.S. Pat. No. 5,217,770 to Morris, Jr. et al. (hereinafter the '770 patent). FIG. 1 is intended to present only the needling zone of any such apparatus. Thus the invention is adaptable for use with an apparatus for forming a sheet or "board" as described in the '052 patent, or for forming an annulus as described in the '123 and '770 patents. Any variation in shape of the fibrous preform structure produced is considered to be within the purview of the invention.

Still referring to FIG. 1, a fibrous preform structure 20 is shown in the process of being formed in apparatus 8. The fibrous structure 20 is disposed on a support or bedplate 12 beneath a multitude of felting needles 14 mounted in a needle board 16. Support 12 is penetrable by the needles 14, and may be formed from a penetrable material such as foamed plastic or brush bristles, or an impenetrable material such as metal or plastic with holes aligned with the needles 14 to allow penetration. Fibrous structure 20 is comprised of fibrous layers with a top layer defining an exposed surface 44. The fibrous structure is then subjected to a needling pass in which the multitude of felting needles 14 are repeatedly driven into the fibrous structure 20 through exposed surface 44 as the fibrous structure 20 is passed beneath the felting needles in the direction of arrow 34. As used herein, the term "fibrous structure" refers to all the fibrous layers disposed on the support 12 beneath the felting needles 14 during a given needling pass. Layers may be added to the fibrous structure at one or more needling passes, but it is not necessary to add a fibrous layer to the fibrous structure at every needling pass.

The felting needles 14 are arranged in an array as is known in the art. Several rows may be arranged parallel to each other so the entire width of the fibrous structure 20 may be subjected to needling with each needling pass. The array of felting needles 14 defines a needling zone 32.

The felting needles 14 are driven by means of a drive mechanism 18 that drives needle board 16 through a fixed range of travel in a reciprocating motion. The multitude of felting needles thereby displace fibers among layers of the fibrous structure 20 producing "Z-fiber" bundles that pass between layers generally perpendicular to the layer interfaces. Additional layers are disposed over previous layers and subjected to additional needling passes which adheres the additional layers to the previous layers. Additional layers are added until a final desired thickness is established. The fibrous structure 20 may then be subjected to further needling passes without adding additional layers. The finished fibrous preform structure 20 can be processed in subsequent operations, in known manner, as previously described.

A support adjustment mechanism 22 adjusts the support position relative to the multitude of felting needles 14 in a manner well known in the art. Here, the support adjustment mechanism comprises jackscrew 24 and motor/gearbox 26. A controller 28 controls the support adjustment mechanism 22 via control line 30 as necessary in order to precisely position the support 12 relative to the multitude of felting needles 14. Support 12 is driven in the direction of arrow 34 such that the multitude of felting needles may be repeatedly driven into the exposed surface 44 along the length of fibrous structure 20. The support may be subsequently driven in the direction of arrow 36 thereby needling the fibrous preform structure in the opposite direction, as described in the '052 patent. The support would normally be driven in only one direction if an annular shape is being formed as described in the '123 or '770 patents. Also, the support 12 may be continuously driven as the needles are driven into fibrous structure 20, or the support may be synchronized with drive mechanism 18 such that the support 12 momentarily stops when the needles 14 are driven into fibrous structure 20. Any such variations are considered to be within the purview of the invention. Also, the various components of apparatus 8 may be oriented in various obvious ways without departing from the invention. For example, apparatus 8 could be rotated onto a side or even inverted if a particular application necessitated such an arrangement.

Figure 2:
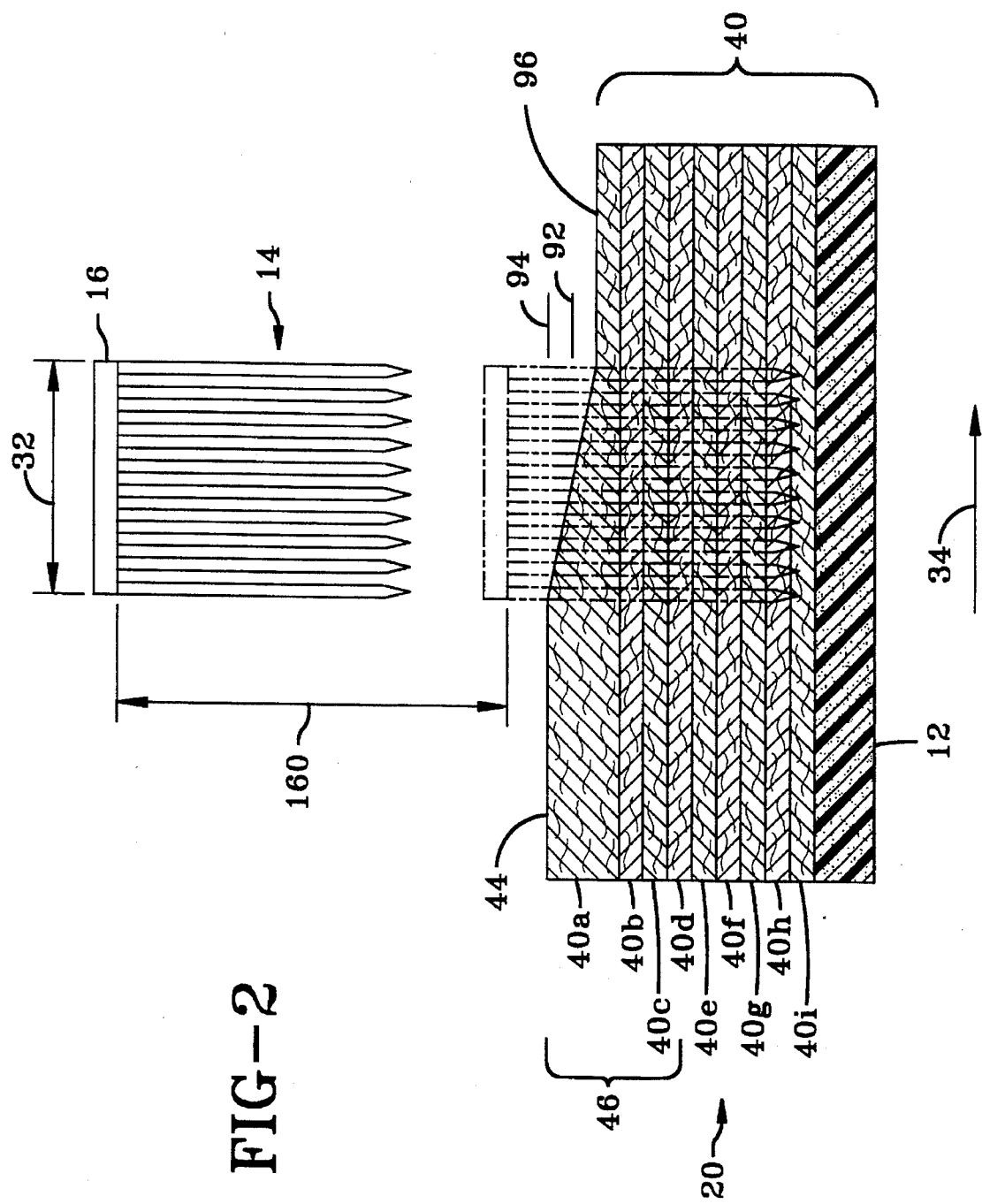
FIG. 2 depicts a detailed view of a needling process using the FIG. 1 apparatus.

A process according to an aspect of the invention is depicted in FIG. 2, wherein a fibrous structure 20 comprising at least two fibrous layers 40a–40i is disposed beneath the multitude of felting needles 14 on support 12. As depicted, the fibrous structure 20 may comprise a multitude of superposed layers, and the stack of layers may become so thick that the felting needles 14 do not penetrate all the way through the fibrous structure. A top fibrous layer 40a is disposed over lower adjacent layers 40b, 40c, 40d, 40e, 40f, 40g, 40h, and 40i with the top layer 40a defining an exposed surface 44. In this example, top layer 40a is not adhered to layer 40b until it is subjected to a needling pass in which fibrous layers 40a–40i are passed beneath the multitude of felting needles 14 while the multitude of felting needles 14 are repeatedly driven through the exposed surface 44 into the fibrous structure, as shown in phantom, deep enough to permanently transport fiber from layer 40a into lower adjacent layer 40b. The needling pass adheres top layer 40a to layer 40b by permanently transporting fiber from the top layer 40a into layer 40b and other lower adjacent layers.

According to an aspect of the invention, fiber is permanently transported from a chosen set 46 of layers for each needling pass. The set of layers may change from one needling pass to the next. Choosing the set of layers is a matter of preform design according to desired final preform properties, and is not part of the invention. In practicing the invention, the set of layers includes at least the top layer 40a. The set of layers preferably includes top layer 40a and at least one adjacent layer 40b. In the example shown in FIG. 2, set 46 includes layers 40a, 40b, and 40c. The set of layers could include more than three layers in many applications.

Figure 3:
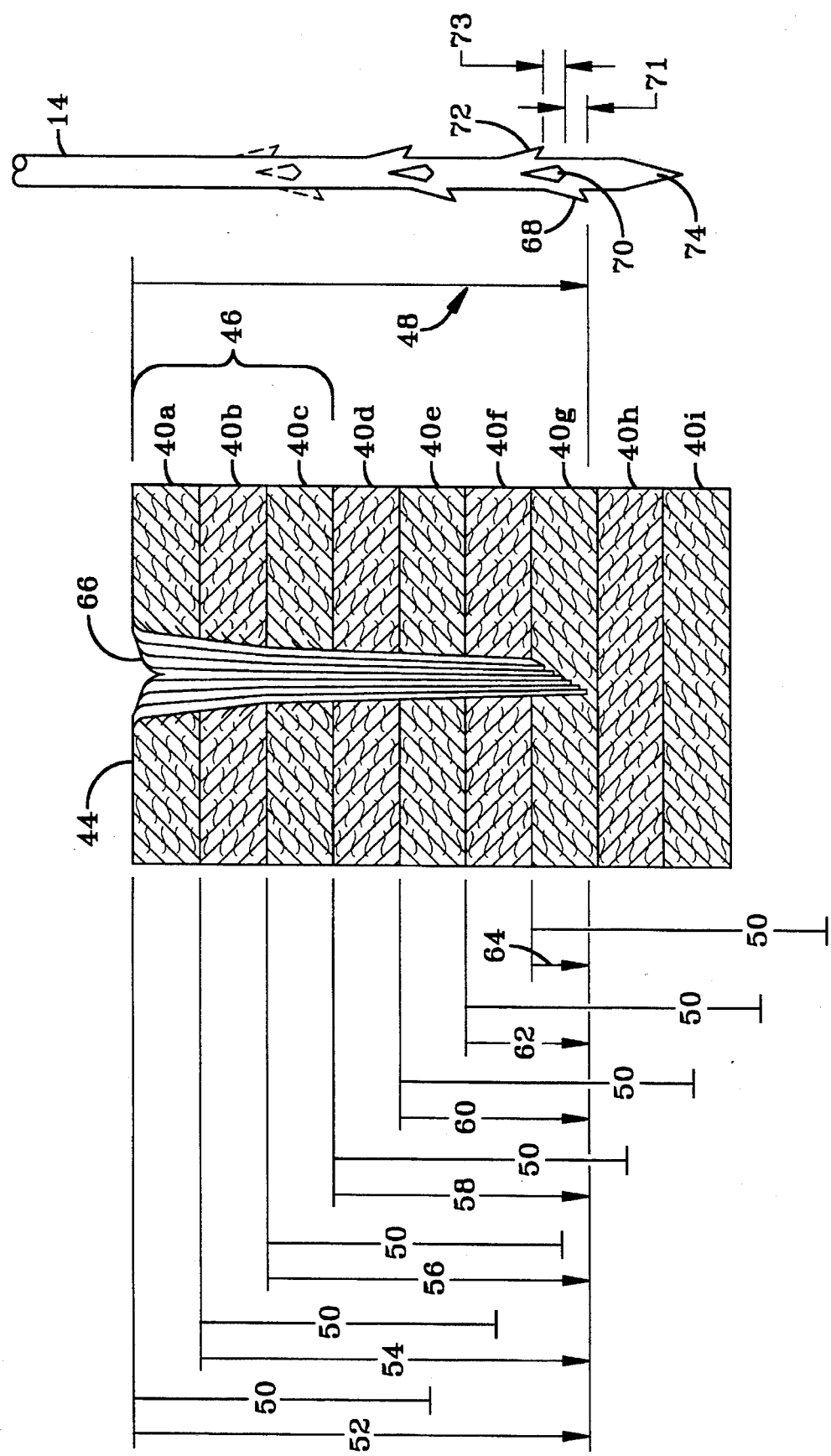
FIG. 3 depicts a detailed view of a Z-fiber bundle generated during the FIG. 2 needling process.

Referring now to FIG. 3, a bundle 66 of Z-fibers generated by a single felting needle 14 is shown extending through the top layer 40a and down through the fibrous structure into layers 40b–40g. Felting needle 14 is shown to one side of the fibrous structures for the sake of clarity. Here, felting needle 14 has a tip 74 and comprises a first barb 68 nearest the tip 74, a second barb 70 spaced from the first barb 68 further away from tip 74, and a third barb 72 spaced from the second barb 70 further away from tip 74. Further sets of barbs may be spaced along the felting needle 14 as shown. In the example shown, barbs 68, 70, and 72 engage and transport fiber from layers 40a–40f when the felting needle 14 is driven Into those layers.

Fibers commonly used as carbon precursor materials such as polyacrylonitrile fiber (PAN) and oxidized polyacrylonitrile fiber (OPF) have resilient qualities that cause the fibers to pull back to the layer from which they originate unless transported at least a minimum distance. When the fibrous layers are made from long or continuous filaments, permanent fiber transport may not be achieved unless the fibrous are transported far enough to cause fiber rupture. Temperature and humidity may have an effect. As used herein, the term "permanent fiber transport" means that the felting needles 14 transport rider from one layer into at least one adjacent layer during a given needling pass that stays transported after the felting needles 14 are withdrawn from the fibrous structure 20. Increasing fiber transport depth by as little as 0.5 mm can result in a transition from no permanent fiber transport to permanent fiber transport. This was a surprising discovery. Thus, the multitude of felting needles 14 together engage and transport an aggregate of fiber from the set of layers during the needling process and less than 100% of the aggregate is permanently transported if the fiber comprising the fibrous layers tends to pull back to its layer of origin as described.

Fiber length, fiber crimp, and fiber surface finish may also affect permanent fiber transport. Staple fibers, or fibers that are crimped or have a rough or scaled surface (similar to wool) may have less of a tendency to pull back to their layer of origin. The minimum distance for fibrous layers comprised of fibbers having one or more of these characteristics may be much less than the minimum distance for fibrous layers comprised of smooth, uncrimped, continuous fibers of the same composition. In this case, the minimum distance may have at least a small threshold value since fiber must be transported at least some distance in order to cohere the fibrous layers. With fibers having these characteristics, essentially 100% of the aggregate of fiber engaged by the multitude of felting needles 14 may be permanently transported because the fiber comprising the fibrous layers has little tendency to pull back to its layer of origin.

Thus, according to an aspect of the invention, a desired fiber transport depth 48 is determined relative to the top layer 40a that is sufficient to achieve permanent fiber transport from the chosen set of layers 46 without permanently transporting a significant amount of fiber from more than the chosen set of layers 46. If the fibrous layers have resilient qualities, permanent fiber transport is not achieved until the transport depth exceeds the minimum distance 50.

For example, fiber is transported to a depth 52 from layer 40a, which is greater than minimum distance 50, which means that the fiber transported from layer 40a is permanently transported. Likewise, fiber is transported to depths 54 and 56 from layers 40b and 40c respectively, which are greater than the minimum distance 50, which means that the fiber transported from layers 40b and 40c is permanently transported. Fiber is transported to depths 58, 60, 62, and 64 from layers 40d, 40e, 40f, and 40g respectively, which are less than the minimum distance 50, which means the fiber transported from layers 40d through 40g is not permanently-transported. The fiber transported from those layers pulls back to those layers. Thus, fiber is permanently transported from the set 46 of layers without permanently transporting a significant amount of fiber from more than the set 46 of layers.

Figure 4A:
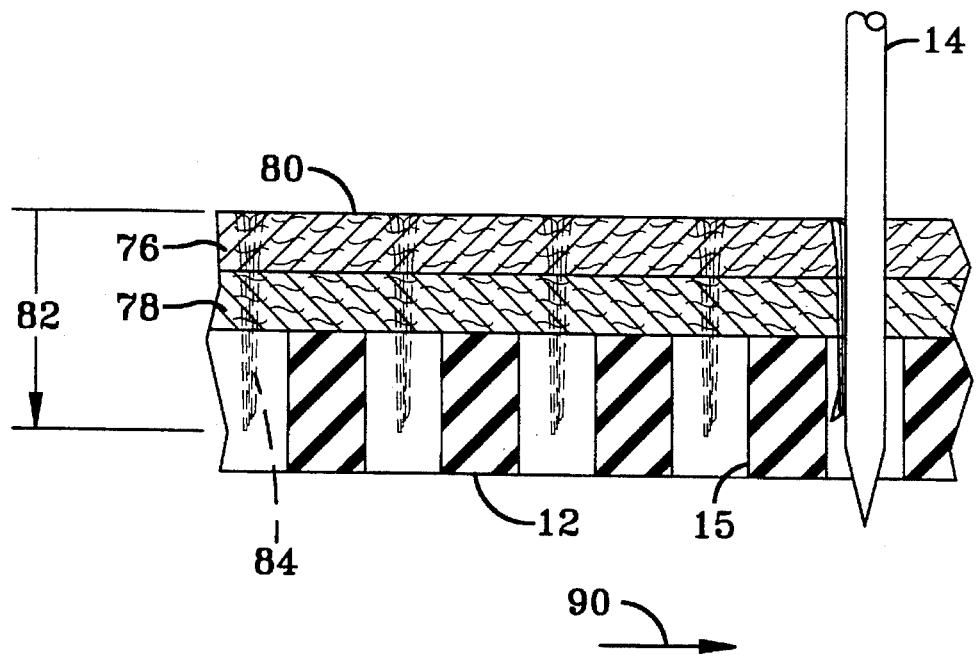
FIG. 4A depicts a first part of a method for determining a minimum fiber transport distance.
Figure 4B:
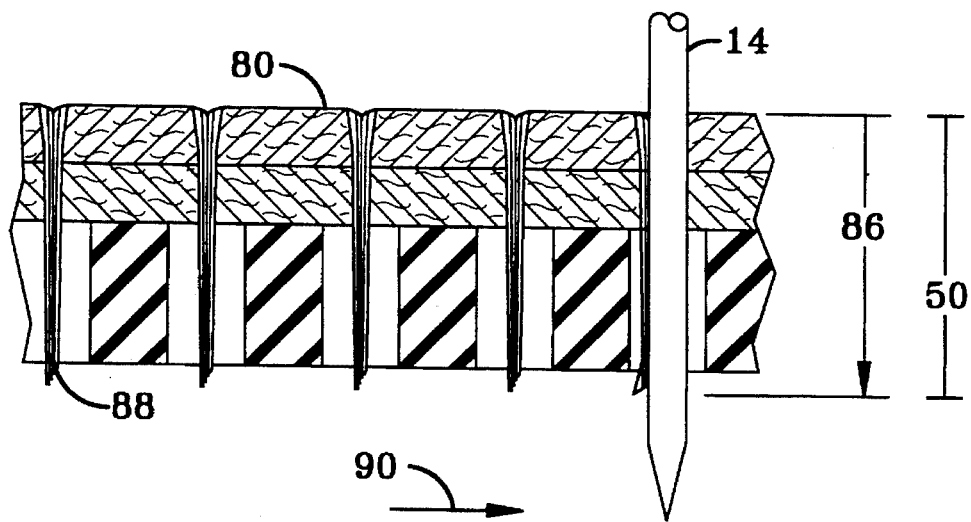
FIG. 4B depicts a second part of a method for determining a minimum fiber transport distance.

A preferred method for determining the minimum distance 50 is depicted in FIGS. 4A and 4B. Referring to FIG. 4A, a first fibrous layer 76 is disposed over a second fibrous layer 78 with the first fibrous layer 76 defining an exposed surface 80. Second fibrous layer 78 is disposed over support 12. The first fibrous layer 76 is substantially similar to top layer 40a of FIG. 3, and the second fibrous layer 78 is substantially similar to layer 40b of FIG. 3. Referring still to FIG. 4A, fiber is transported from the first layer 76 into the second layer 78 by repeatedly driving a multitude of felting needles into the exposed surface 80 through the first layer 76 and into the second layer 78 in a manner substantially similar to the needling process used to form the fibrous preform structure as depicted in FIGS. 1-3, using felting needles 14 substantially similar to those used in the needling process. Only one needle and only one barb are shown for the sake of clarity. Support 12 is perforated by holes 15 that are aligned with the needles 14, which permit penetration of needle 14 into the support 12 as shown. The fibrous layers 76 and 78 are passed beneath the felting needles 14 in the direction of arrow 90 as the needles are driven into the fibrous layers, beginning with fiber transport depth 82. As shown, Z-fiber bundles 84 are created, but pull back to the top layer because fiber was not transported a great enough distance from top layer 76. The portion of the Z-fiber bundle that pulls back is shown in phantom. Referring now to FIG. 4B, the fiber transport depth is increased (by moving support 12 toward the multitude of felting needles 14) until the first layer just begins to tack to the second layer 78, at which point the fiber transport depth 86 corresponds to the minimum distance 50. The first layer 76 begins to tack to the second layer 78 because the transport depth 86 has a magnitude sufficient to permanently transport fiber from the top layer 76 thereby creating permanent fiber bundles 88 that bond the two layers together.

Minimum distance 50 could also be determined by disposing fibrous layer 76 over a multitude of previously needled layers (a fibrous structure or "board"), and performing the process of increasing needle penetration depth until the layer 76 is tacked down. This approach may more accurately quantify minimum distance 50 since the fibrous structure comprises two layers (as shown in FIG. 4) at only the beginning of the process of forming a fibrous preform structure. With only two layers, the Z-fiber bundles extend below the bottom layer into the support. During most of the process, a top layer is disposed over a previously cohered fibrous structure and is subjected to a needling pass (as shown in FIG. 2), and the Z-fiber bundles are completely enclosed within the fibrous structure (as shown in FIG. 3). However, quantifying the minimum distance according to the FIG. 4 process has been found to be quite suitable in the practice of the invention.

According to a preferred embodiment, each of fibrous layers 40 comprise three unidirectional sub-layers of OPF fiber which are lightly needled together into a coherent layer, with the fiber direction of each sub-layer rotated 60° relative to the adjacent sub-layer, as described in EXAMPLE 1 of the '052 patent. The directional orientation of each layer is established by crosslapping a first unidirectional web onto a second longitudinal web before the needling operation. The webs are preferably formed from tows of OPF fiber, each tow being composed of 320,000 filaments. OPF tow suitable for use in the practice of the invention is available from RK Carbon Fibres Limited of Muir of Ord, Scotland, and Zoltek Corporation of St. Louis, Mo., U.S.A. Unoxidized PAN fiber ("greige tow") is available from Courtaulds Advanced Materials of Great Coats Grimsby, South Humberside, England. The minimum distance established according to the FIG. 4 procedure with two of these OPF crosslapped layers was about 6.5 to 7.0 millimeters with felting needles according to catalogue number 15×18×36×3.5 C333 G 1002, available from Groz-Beckert of Germany. The layers just began to tack at a penetration depth of about 6.5 mm and became fully tacked at about 7.0 mm. The OPF fibers of this example had little to no crimp and a very smooth surface. The minimum distance is process dependent on the properties and characteristics of the fibrous layers and the particular needling process to be used in forming the fibrous preform structure. The minimum distance is established empirically.

Transport depth must be known with some degree of certainty in order to quantify permanent fiber transport. As depicted in FIGS. 3 and 4, fiber transport depth is determined relative to the top layer 40a. Referring again to FIG. 2, the fiber transport depth is preferably determined relative to an estimated surface position 92 of the exposed surface 44 beneath the needles 14 during the needling process. The exposed surface 44 moves away from the needles during the needling pass, due at least in part to compaction of the top layer 40a, as the fibrous structure passes through the needling zone 32. According to a preferred embodiment, the estimated surface position 92 for each needling pass is determined by determining a pre-needled surface position 94 of the exposed surface 44, determining a post-needled surface position 96 of the exposed surface 44, and determining the estimated surface position 92 during needling by averaging the pre-needled surface position 94 and the post-needled surface position 96.

The pre-needled surface position 94 can be actively determined, as depicted in FIG. 1, by a first transducer 98 having a surface following device 100 that tracks the position of the exposed surface 44 before the fibrous preform structure is subjected to needling beneath the felting needles 14. The post-needled surface position can be actively determined by a second transducer 102 having a surface following device 104 that tracks the position of the exposed surface 44 after the fibrous preform structure is subjected to needling beneath the felting needles 14. Surface position information from the first and second transducers 98 and 102 is transmitted to controller 28 via transducer lines 106 and 108. The controller 28 then processes the signals and determines the estimated surface position at each point in the process.

The pre-needled surface position 94 and post-needled surface position 96, and hence the estimated surface position 92, may also be determined by previously forming a substantially similar fibrous preform structure in a substantially similar process and determining the pre-needled surface position 94 and the post-needled surface position 96 during formation of the substantially similar fibrous preform structure. This aspect will be discussed in more detail with respect to FIGS. 6 and 8.

Figure 5A:
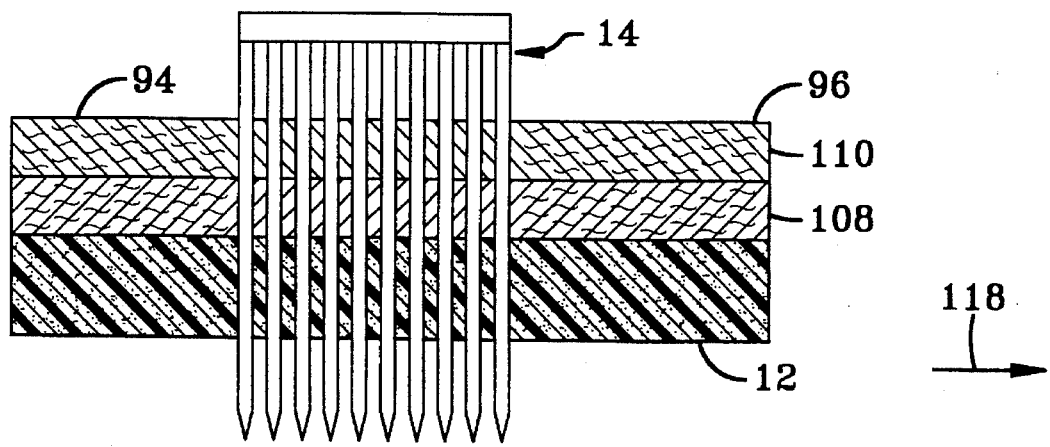
FIG. 5A depicts a first needling pass in a series of needling passes according to an aspect of the invention.

Referring now to FIGS. 5A–5D, a process is depicted according to an aspect of the invention for forming a fibrous preform structure by cohering several fibrous layers together beginning with two fibrous layers 108 and 110 to which additional fibrous layers 112, 114 and 116 are added. As depicted in FIG. 5A, the needling process begins with two layers 108 and 110 that are disposed on the support 12 beneath the multitude of felting needles 14. Each of layers 108, 110, 112, 114, and 116 comprise three unidirectional sub-layers of OPF fiber lightly needled together into a coherent layer, as previously described. The support 12 is formed from metal and perforated with holes into which needles 14 may penetrate. Needles 14 are shown in FIGS. 5A–5D at their furthest downward travel position. In FIG. 5A, fiber is permanently transported from layer 110, through layer 108, and into the support 12 in a first needling pass as the support 12 is driven in the direction of arrow 118. A perforated support such as support 12 does not grip the transported fiber and layers 108 and 110 are not significantly compacted by the needling process. Thus, the pre-needled surface position 94 and the post-needled surface position 96 are about the same. This was a surprising discovery.

Figure 5B:
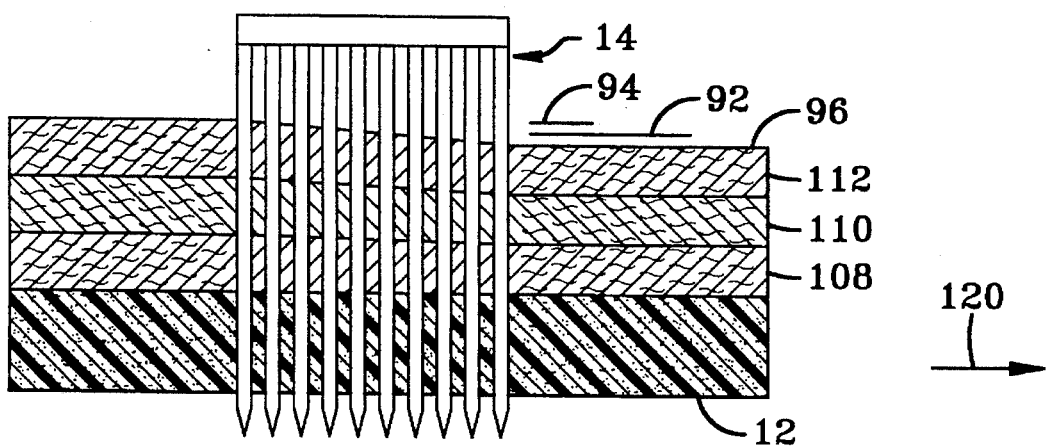
FIG. 5B depicts a second needling pass in a series of needling passes according to an aspect of the invention.
Figure 5C:
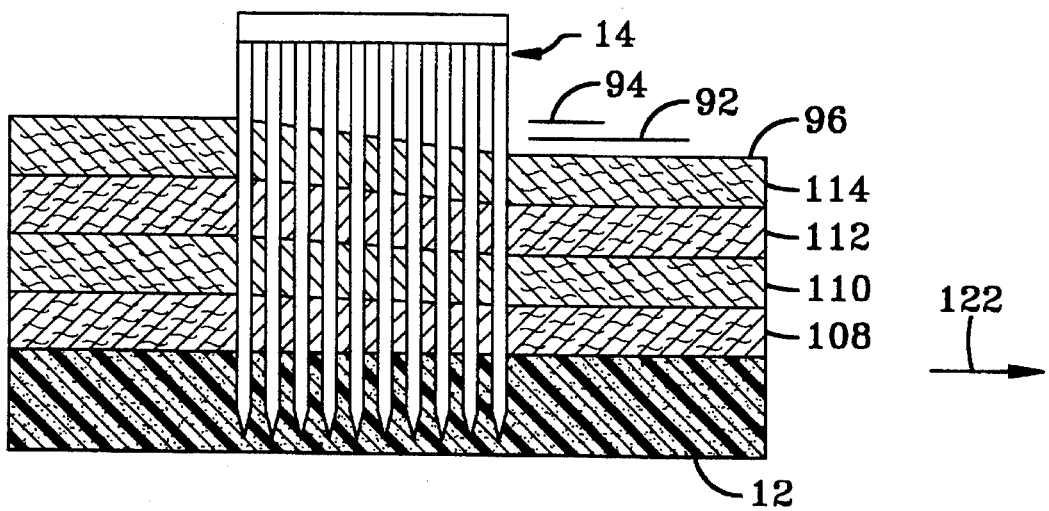
FIG. 5C depicts a third needling pass in a series of needling passes according to an aspect of the invention.
Figure 5D:
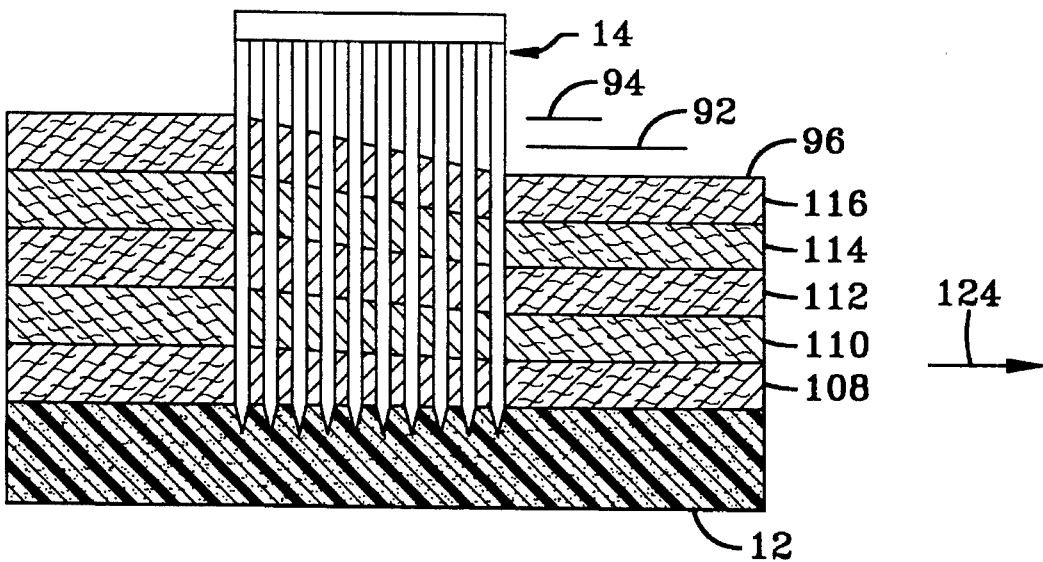
FIG. 5D depicts a fourth needling pass in a series of needling passes according to an aspect of the invention.

In FIG. 5B, an additional fibrous layer 112 is added and needled to layers 108 and 110 in a second needling pass as the support is driven in the direction of arrow 120. At this point, layers 108 and 110 begin to compact and pre-needled surface position 94 is above the post-needled surface position 96, resulting in estimated surface position 92. Another fibrous layer 114 is added in FIG. 5C and needled to layers 108, 110 and 112 in a third needling pass as the support is driven in the direction of arrow 122. Layer 114 is compacted and layers 108, 110 and 112 are compacted some more. In FIG. 5D, another fibrous layer 116 is added and needled to layers 108, 110, 112, and 114 in a fourth needling pass as the support is driven in the direction of arrow 124. Top layer 116 is compacted, and layers 108, 110, 112, and 114 experience more compaction. Thus, the exposed surface into which the needles are driven moves away from the needles during the needling process due at least in part to compaction in the top layer, and due at least in part to compaction within the stack of layers beneath the top layer. In some needling processes, the direction in which the support is driven alternates from one needling pass to the next. Any such variation is considered to be within the purview of the invention.

Figure 6:
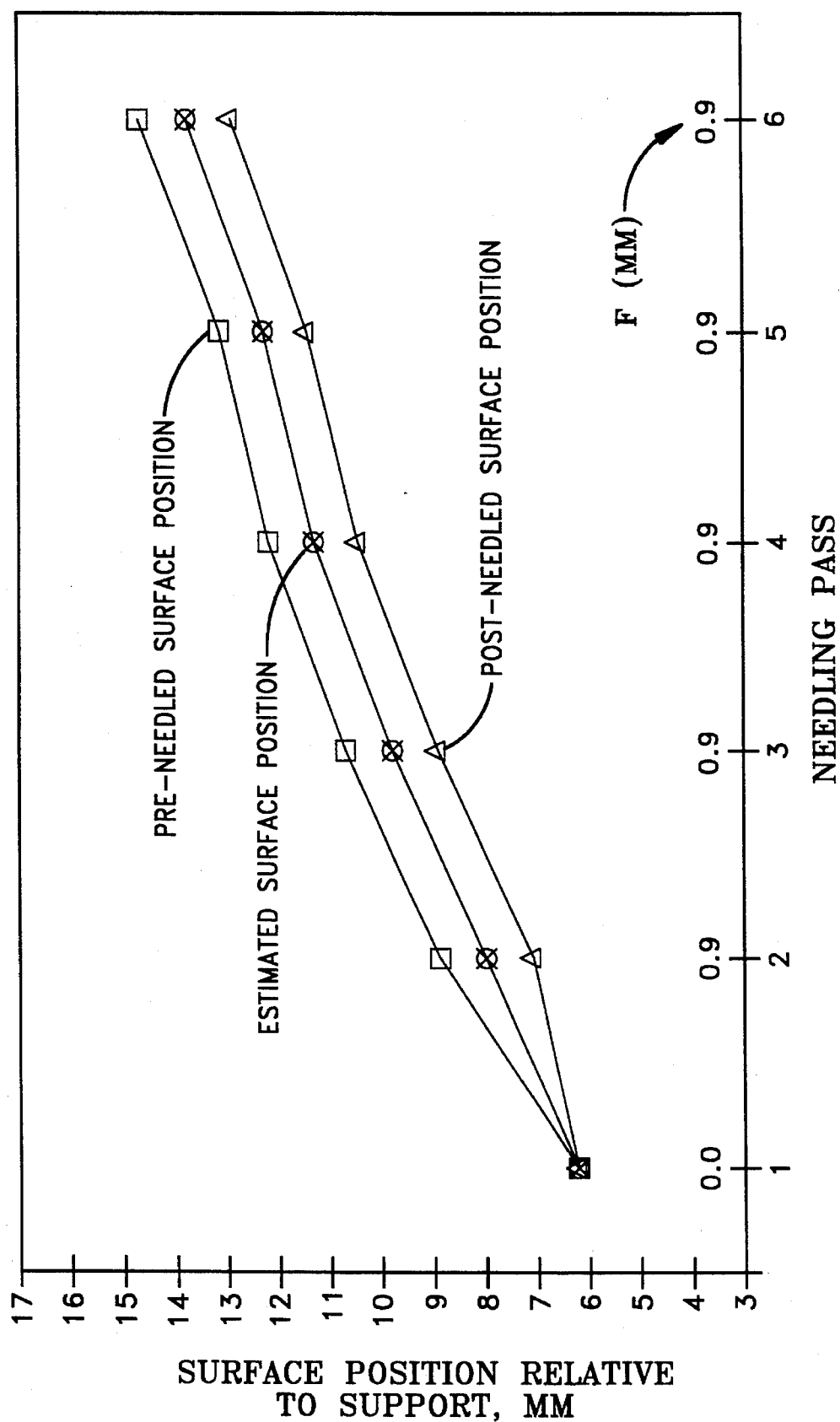
FIG. 6 depicts estimated surface position versus needling pass for the FIG. 5A–5D needling process.

An example of a relationship between surface position and needling pass that represents the FIGS. 5A–5D process is presented in FIG. 6. Needling pass 1 represents FIG. 5A where two layers are disposed beneath the felting needles, and the pre-needled surface position is nearly the same as the post-needled surface position. Another layer is added before each needling pass beginning with needling pass 2. Needling pass 2 represents FIG. 5B where three layers are disposed beneath the felting needles. As shown in FIG. 6, these layers are beginning to compact. Additional layers are added in needling passes 3 and 4 which correspond to FIGS. 5C and 5D. Data from the addition of two layers in needling passes 5 and 6 are also shown. The estimated surface position for each needling step is depicted, which is essentially the average between the pre-needled surface position and post-needled surface position for each needling pass. A compaction factor, F, is also depicted for each needling pass. The compaction factor represents an offset from the post-needled thickness for any given needling pass and establishes the estimated surface position relative to the post-needled surface position. Thus, compensation for compaction in the top layer and the lower layers appears in the compaction factor. According to a preferred embodiment, the compaction factor for a given needling pass is calculated by subtracting the post-needled thickness of the fibrous structure from the pre-needled thickness of the fibrous structure and dividing by two. The compaction factor may be used in a process that characterizes or manipulates the Z-fiber distribution throughout the thickness of a fibrous preform structure. This aspect of the invention will be discussed more fully in relation to FIG. 11 and Equations 7 and 8.

Figure 7A:
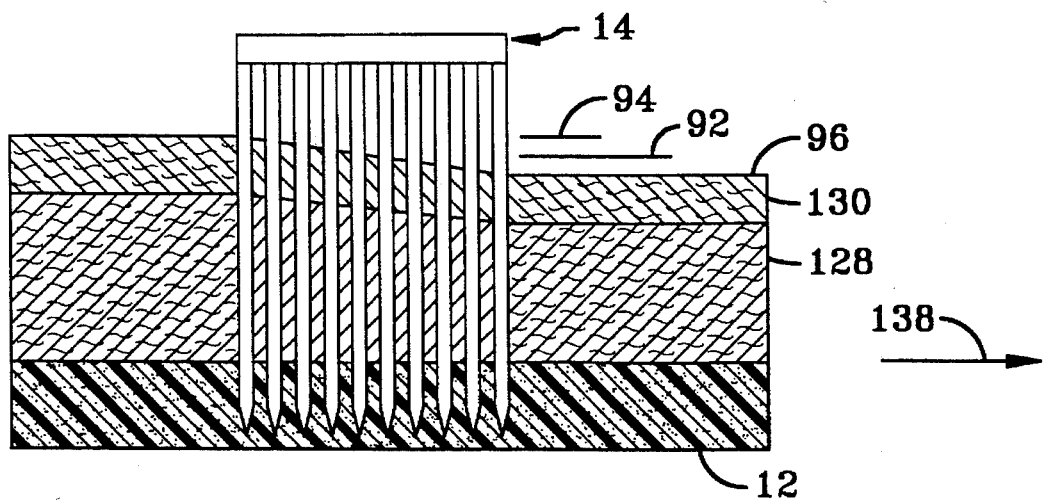
FIG. 7A depicts a first needling pass in a series of needling passes according to an aspect of the invention.

Another process that also represents an aspect of the invention is depicted in FIGS. 7A–7D. The multitude of felting needles 14 are shown at their furthest downward travel in FIGS. 7A–7D. In FIG. 7A, a layer 128 is disposed over support 12 beneath the multitude of felting needles 14. The support 12 is formed from metal and perforated with holes into which needles 14 may penetrate. Another layer 130 is disposed over layer 128. Layer 130 comprises three unidirectional sub-layers of OPF fiber needled together into a coherent layer, as previously described. Layer 128 is an 800 g/m$^2$ pre-needlepunched airlaid OPF web as described in European Patent Application 0 530 741 A1, to Morris et al. Layer 128 is about 8–13 millimeters thick and layer 130 is about 3 millimeters thick before the first needling pass of FIG. 7A. Thus, the pre-needled thickness of layer 128 is much greater than the pre-needled thickness of layer 130. Layer 130 is needled to layer 128 in a first needling pass as support 12 is driven in the direction of arrow 138.

Referring still to FIG. 7A, the layers 128 and 130 are compacted a significant amount during the first needling pass (in contrast to layers 108 and 110 of FIG. 5A) resulting in a large change from the pre-needled surface position 94 to the post-needled surface position 96. The compaction in layer 128 during the first needling pass is due to several factors. Layer 128 is formed of short fibers having a mean length of 25 millimeters or less when measured according to ASTM D 1440, which do not exhibit a great deal of resilient behavior when subjected to needling. In other words, any fiber transported from or within layer 128 by felting needles 14 is permanently transported since the fibers are short and have little tendency to pull back to their starting positions. Layer 128 is also thick enough to permit permanent fiber transport originating and ending entirely within the layer. Also, layer 128 is thick enough to grip fibers transported from layer 130. Finally, layer 128 is more susceptible to compaction since it is thick and of lesser fiber volume (fiber per unit volume), and has not previously been subjected to a great amount of needling.

Figure 7B:
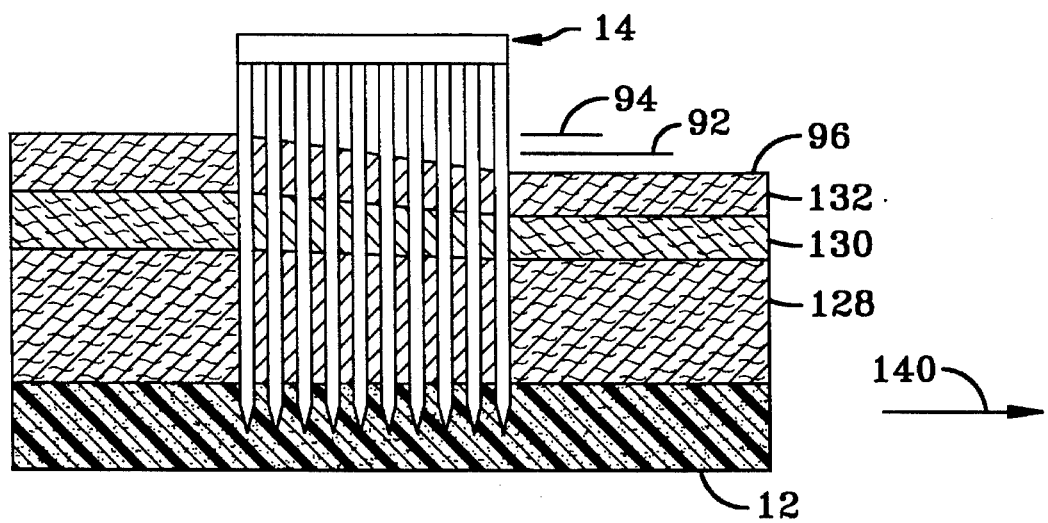
FIG. 7B depicts a second needling pass in a series of needling passes according to an aspect of the invention.
Figure 7C:
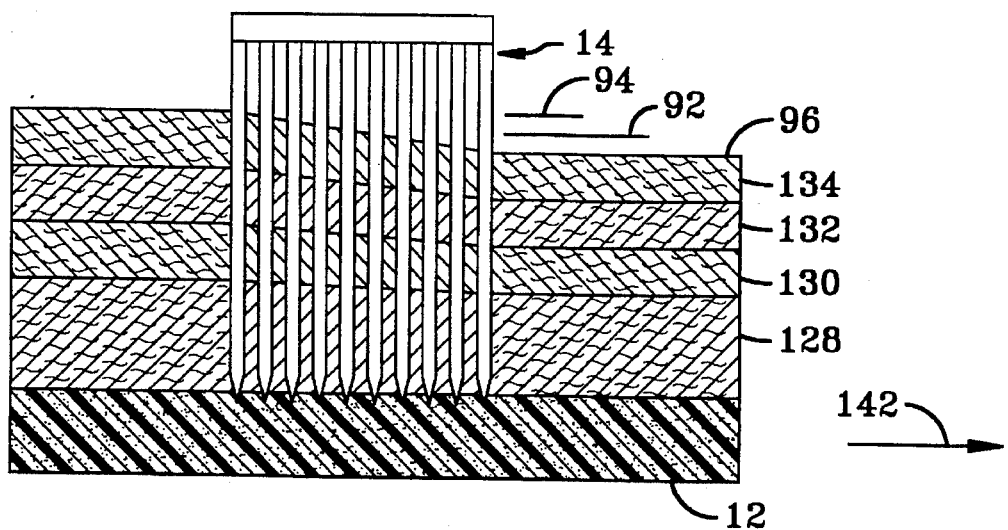
FIG. 7C depicts a third needling pass in a series of needling passes according to an aspect of the invention.
Figure 7D:
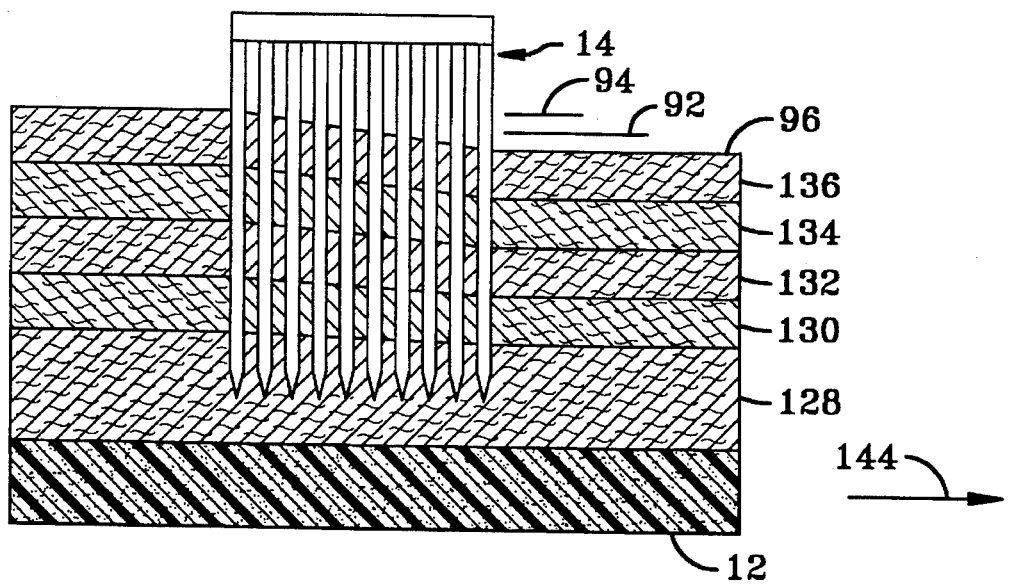
FIG. 7D depicts a fourth needling pass in a series of needling passes according to an aspect of the invention.

An additional layer 132 is added in FIG. 7B which is compacted during a second needling pass as support 12 is driven in the direction of arrow 140. Layers 128 and 130 are further compacted, such that the combined compaction of the layers results in a change from pre-needled surface position 94 to post-needled surface position 96, and an estimated surface position 92. Additional layers 134 and 136 are added and needled in third and fourth needling passes as support 12 is driven in the direction of arrows 142 and 144, respectively, as depicted in FIGS. 7C and 7D. These needling passes cause further compaction of previously needled layers. Once again, the exposed surface into which the needles are driven moves away from the needles during the needling process due at least in part to compaction in the top layer, and due at least in part to compaction within the stack of layers beneath the top layer.

Figure 8:
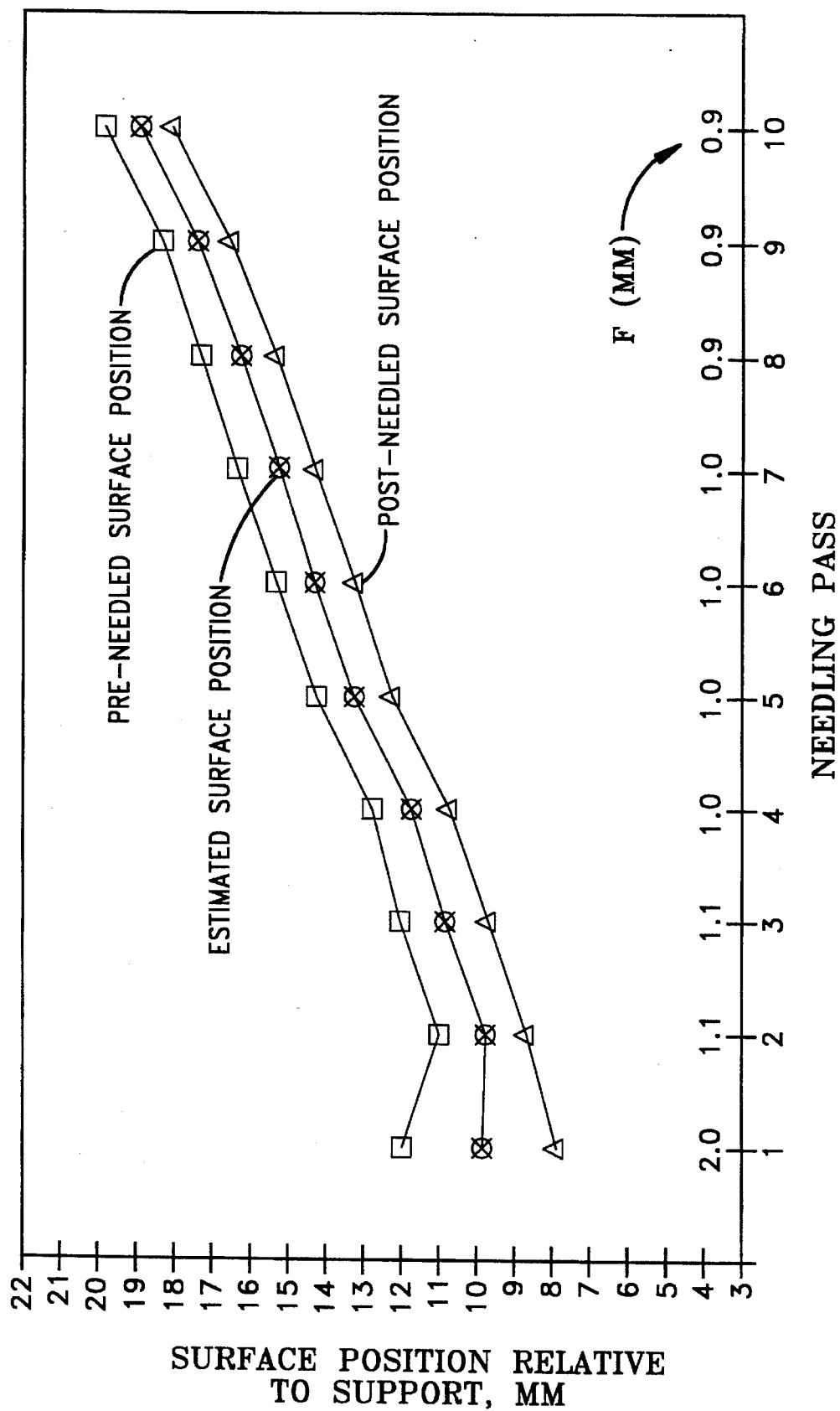
FIG. 8 depicts estimated surface position versus needling pass for the FIG. 7A–7D needling process.

An example of surface position versus needling pass that represents the FIG. 7A–7D process is depicted in FIG. 8. Needling pass I represents FIG. 7A where two layers are disposed beneath the felting needles. As shown in FIG. 8, needling pass 1 induces a relatively large change from pre-needled surface position to post-needled surface position. Another layer is added before each needling pass beginning with needling pass 2. Needling pass 2 represents FIG. 7B where three layers are disposed beneath the felting needles. As shown in FIG. 8, the change from pre-needled surface position to post-needled surface position is less than the previous needling step. Additional layers are added in needling passes 3 and 4 which correspond to FIGS. 7C and 7D. Data from the addition of six layers in needling passes 5–10 are also shown. The estimated surface position for each needling step is depicted, which is essentially the average between the pre-needled surface position and post-needled surface position for each needling pass. Compaction factor F is also depicted. Note that the FIG. 8 compaction factor has a significantly different trend from the FIG. 6 compaction factor.

Experiments have shown that estimated surface position versus needling step and compaction factor as depicted in FIGS. 6 and 8 does not change significantly from one fibrous preform structure to the next, as long as the fibrous preform structures are substantially similar and are formed in substantially similar processes. Therefore, the estimated surface position and compaction factor for each needling pass may be derived from a previously established relationship. In such case, the relationship is established by previously forming a substantially similar fibrous preform structure in a substantially similar process and determining the estimated surface position during formation of the substantially similar fibrous preform structure. FIGS. 6 and 8 represent such previously established relationships that can be subsequently used in the production of other substantially similar fibrous preform structures.

Variations in compaction can arise from different sources. FIGS. 5 and 6 involve a situation where the first two fibrous layers do not significantly compact during the first needling pass. The compaction in these layers occurs during subsequent needling passes. FIGS. 7 and 8 involve a situation where one of the beginning layers is relatively thick and is compacted during the first needling pass, but continues to compact during subsequent needling passes. The process according to the invention is flexible enough to address both of these situations, and application of the invention is not limited to these examples. Compaction can occur in different ways depending on the characteristics of the fibrous layers and the particular needling process and machinery, and may be accounted for according to the principles provided by this disclosure. Further, FIGS. 5 through 8 were derived from fibrous preform structures formed on a perforated bedplate that does not grip the transported fibers, as previously described. A support formed from foamed plastic or upright brush bristles may grip the transported fibers more effectively. However, some compaction effects could still occur and may be addressed according to the principles provided by this disclosure. Any such variations are considered to be within the purview of the invention.

According to another aspect of the invention, permanent fiber transport from each layer in the set of layers may be quantified. However, identifying the exact measure of fiber transported from each layer is not necessary in the practice of the invention. What is meant by "exact measure" is identifying for each layer a certain mass of fibers permanently transported from that layer, or number of fibers transported from that layer, or similar quantification. According to the invention there is provided a technique for generating a relative comparison of transport efficiency and resultant Z-fiber generation for each layer of the fibrous preform structure, or at each stage of the process. This represents a tremendous advantage since tracking and identifying fiber loading and unloading in a particular barb as it passes through the layers is presently extremely difficult. For example, with the fibrous layers and needling processes discussed herein for the purpose of describing the present invention, the barbs on a given needle become completely loaded with fiber almost immediately after penetrating the exposed surface. The barbs unload to some extent as they penetrate into lower layers due to fiber breakage. The barbs engage more fiber from whatever layer they happen to be passing through as they unload. Thus, most of the fiber in Z-fiber bundle 66 of FIG. 3 is from layer 40a, and smaller fractions are from layers 40b and 40c. Identifying the exact measure of fiber in a Z-fiber bundle from a given layer is desirable, but not necessary in the practice of the invention, as long as the fiber permanently transported from a given layer is quantified in some manner.

According to an aspect of the invention, permanent fiber transport is quantified as follows. Referring again to FIG. 3, each barb engages an amount of fiber from a given layer in the set of layers as each barb passes through that layer. The amount is usually different for each barb on a given felting needle. Each felting needle 14 engages and transports a quantity of fiber from a given layer in the set of layers, which is the sum of the amount engaged from that layer by each barb that passes through that layer. For example, in a certain preferred embodiment, the top layer in each needling pass comprises three cross-lapped unidirectional sub-layers of OPF fiber needled together into a coherent layer, as previously described, and the felting needles are catalogue number 15×18×36×3.5 C333 G 1002 needles, available from Groz-Beckert of Germany. In this example, the first barb 68 engages 70% of the quantity transported from a given layer, the second barb 70 engages 25% of the quantity transported from a given layer, and the third barb 72 engages only 5% of the quantity transported from a given layer during a given needling pass. Based on current understanding, tests performed by the needle manufacturer have shown that other barbs spaced further up the felting needle do not engage and transport fiber as effectively in this process. Also, most of the fiber transported by a given felting needle in this process appears to be from the top layer since each barb almost immediately loads with fiber upon being driven into the top layer. The barbs tend to unload and pick up new fiber from other layers as they pass through the fibrous structure, as previously described in relation to FIG. 3. However, this may not be the case for all needling processes or for all types of fibrous layers. The fiber transport characteristics depend on the characteristics of the fibrous layers and the particular needling process and machinery, and should be empirically determined for each system.

The quantity of fiber permanently transported from a given layer, top layer 40a for example, is approximated by summing together the amount engaged from that layer by each barb that travels at least the minimum distance from that layer. For example, barb 68 travels through the transport distance 52 from the top layer 40a, which is greater than the minimum distance 50 from that layer. Therefore, any fiber transported by barb 68 from layer 40a is permanently transported. Barb 70 travels-through a distance from top layer 40a as calculated by the following equation:

$$D1_2 = D1_1 - d_1 \qquad \text{Eqn. (1)}$$

wherein $D1_2$ is the distance second barb 70 travels from layer 40a, $D1_1$ is the distance first barb 68 travels from top layer 40a ($D1_1$=transport depth 52), and $d_1$ is the distance 71 between the first barb and the second barb 70. $D1_2$ is also greater than the minimum distance 50 from layer 40a, as depicted in FIG. 3, which means that any fiber that second barb 70 transports from layer 40a is permanently transported. Barb 72 travels through a distance from top layer 40a as calculated by the following equation:

$$D1_3 = D1_1 - d_1 - d_2 \qquad \text{Eqn. (2)}$$

wherein $D1_3$ is the distance third barb 72 travels from layer 40a, $D1_1$ is the distance first barb 68 travels from top layer 40a ($D1_1$=transport depth 52), $d_1$ is the distance 71 between the first barb and the second barb 70, and $d_2$ is the distance 73 between the second barb 70 and the third barb 72. $D1_3$ is greater than the minimum distance 50 from layer 40a, which means that any fiber that third barb 72 transports from layer 40a is permanently transported. Therefore, 100% of the fiber engaged and transported by the needle from layer 40a by felting needle 14 is permanently transported since $D1_1$, $D1_2$, and $D1_3$ are all greater than the minimum distance 50. This example is based on the previously stated partial quantity estimates of 70% for the first barb, 25% for the second barb, and 5% for the third barb.

Similar calculations may be performed for layer 40b, wherein $D2_1$ is transport depth 54, according to the following equations:

$$D2_2 = D2_1 - d_1 \qquad \text{Eqn. (3)}$$

$$D2_3 = D2_1 - d_1 - d_2 \qquad \text{Eqn. (4)}$$

wherein $D2_1$ is the distance barb 68 travels from layer 40b, ($D2_1$=transport depth 54), $D2_2$ is the distance second barb 70 travels from layer 40b, $D2_3$ is the distance third barb 72 travels from layer 40a, $d_1$ is the distance 71 between the first barb and the second barb 70, and $d_2$ is the distance 73 between the second barb 70 and the third barb 72. Performing these calculations for this example would show that all three barbs traveled more than the minimum distance from layer 40b, meaning that 100% of the fiber engaged and transported by the needle from layer 40b is permanently transported. Equations 1–4 are defined by the following equation:

$$DN_B = DN_1 - \sum_{b=2}^{B} d_{b-1}; \quad \text{for } B \geq 2 \qquad \text{Eqn. (5)}$$

wherein N specifies a given layer penetrated by the first barb 68 (N=1 for the top layer 40a, N=2 for layer 40b, N=3 layer 40c, ...), B indicates a specific barb on the felting needle that transports fiber (B=2 for second barb 70, B=3 for third barb 72, and so on up the needle), $DN_B$ is the distance a specific barb travels relative to layer N, and $d_{b-1}$ is the distance from one barb (b–1) to the next barb (b) along the needle. Thus, the calculations can be performed for as many layers as are penetrated by the first barb, and for every barb on a felting needle that engages and transports fiber. However, there is no need to perform the calculations for more than the set of layers since fiber is not permanently transported from more than the set of layers. Equation 5 applies only if B≧2 because there is no need to determine transport depth for additional barbs if there is only one barb on the needle.

Carrying out the calculations for layer 40c (n=3) using transport depth 56 for $D3_1$ would show that $D3_1$ and $D3_2$ are greater than the minimum distance 50, but $D3_3$ is less than the minimum distance. Therefore, fiber engaged by third barb 72 from layer 40c would not be permanently transported, but fiber engaged by first barb 70 and second barb 72 from layer 40c would be permanently transported. Only 95% of the fiber engaged from layer 40c by the needle was permanently transported (70% for the first barb+25% for the second barb). The 5% of fiber engaged by third barb 72 from layer 40c was not permanently transported. As previously described, these estimates of permanent fiber transport depend on the particular felting needle, fibrous layer characteristics, and needling process. The percentages of 70%, 25% and 5% are used by way of example and are not intended to limit the invention to just these quantities.

It is important to note that permanent fiber transport from each layer is thus quantified without identifying the exact measure of permanent fiber transport from each layer. The quantity of permanent fiber transport in this context refers to the percentage (or any equivalent measure such as a fraction) of fiber engaged by the needle from a given layer at the bottom of the needle stroke that becomes permanently transported. It is quite foreseeable that the quantity of permanent fiber transport may eventually become quantifiable in other ways. For example, using the exact measure for each layer would be desirable if an effective technique for determining the exact measure for each layer becomes available.

Still referring to FIG. 3, the transport depths 54, 56, 58, 60, 62, and 64 from each layer 40a through 40f may be derived from the transport depth 52 relative to top layer 40a. According to a preferred embodiment, the transport depth 52 is determined relative to the estimated surface position of the top layer 40a, as previously described. More preferably, the estimated surface position is an average of the pre-needled surface position and post-needled surface position. A post-needled thickness of each layer disposed beneath the felting needles is then determined. The transport depth for a given layer is determined from transport depth 52 by subtracting the thickness of each layer disposed above that layer from the transport depth 52. For example, transport depth 54 from layer 40b is determined by subtracting the thickness of layer 40a from transport depth 52. The transport depth 56 relative to layer 40c is determined by subtracting the post-needled thicknesses of layers 40a and 40b from transport depth 52. Thus, the transport depth relative to any given layer may be calculated from the transport depth 52 from the top layer 40a according to the following equation:

$$DN_1 = D1_1 - \sum_{n=2}^{N} t_{n-1}; \quad \text{for } N \geq 2 \qquad \text{Eqn. (6)}$$

wherein N specifies a given layer beneath top layer 40a (N=1) penetrated by the first barb 68 (N=2 for the second layer 40b, N=3 for the third layer 40c, N=4 for the fourth layer 40d, . . .), $DN_1$ is the transport depth from layer N, $D1_1$ is the transport depth from the top layer 40a (transport depth 52), and $t_{n-1}$ is the thickness of the each layer disposed above layer N. The calculations may be repeated for as many layers as are penetrated by the first barb 68 (seven layers in FIG. 3). However, there is no need to perform the calculations for more than the set of layers (layers 40a–40c in FIG. 3) since fiber is not permanently transported from more than the set of layers. This equation is based on the distance the first barb 68 travels relative to the top layer 40a. The distance that additional barbs travel relative to each layer may be calculated according to Equations 1–5.

Figure 9:
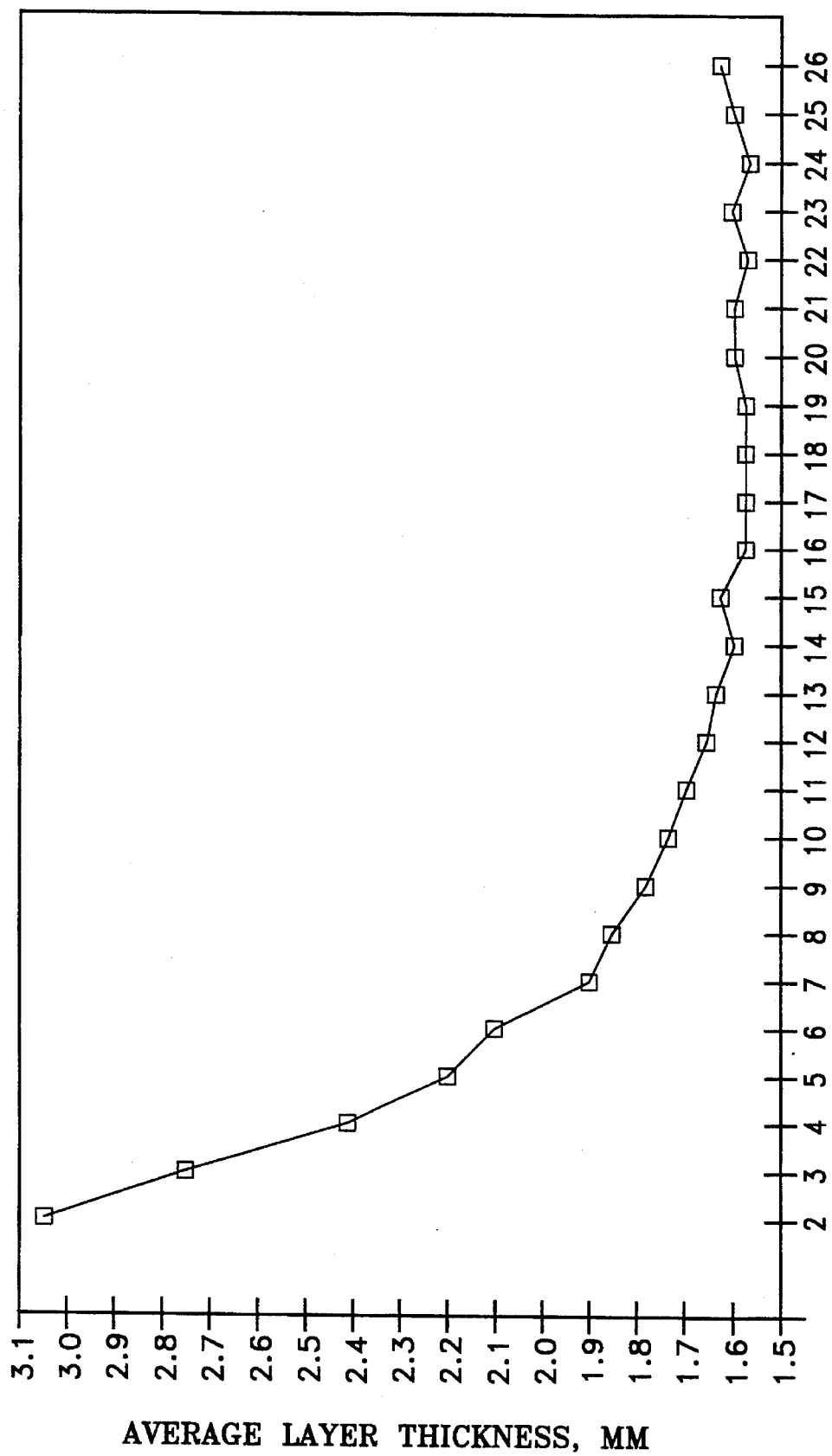
FIG. 9 depicts a compaction curve showing post-needled average layer thickness of the layers comprising a fibrous preform structure versus number of layers according to an aspect of the invention.

If the layers are substantially similar, the post-needled thickness may be calculated for each needling pass as an average thickness of the group of layers comprising the fibrous structure at that needling pass. The thickness of the group of layers may change as the layers are subjected to additional needling passes and as additional layers are added as depicted in FIGS. 5A–5D. An example of a relationship between number of layers and average layer thickness is depicted in FIG. 9, beginning with two layers. FIG. 9 is referred to as a compaction curve. A layer was added to the fibrous preform structure before each needling pass. As shown, average thickness decreases as the number of layers (and needling passes) increases.. This trend is caused by the fact that previously needled layers comprising the fibrous structure continue to compact for several subsequent needling passes. These layers compact as additional layers are added.

The average thickness of layers comprising the fibrous structure may be determined at each point in the process from a curve such as that presented in FIG. 9 by previously forming a substantially similar fibrous preform structure in a substantially similar process and determining the average thickness during formation of the substantially similar fibrous preform structure. This information can then be used to form subsequent fibrous preform structures without actively determining the average layer thickness during the process. This approach greatly simplifies the process. A curve such as that presented in FIG. 9 may be programmed into a controller such as controller 28 of FIG. 1.

Figure 10:
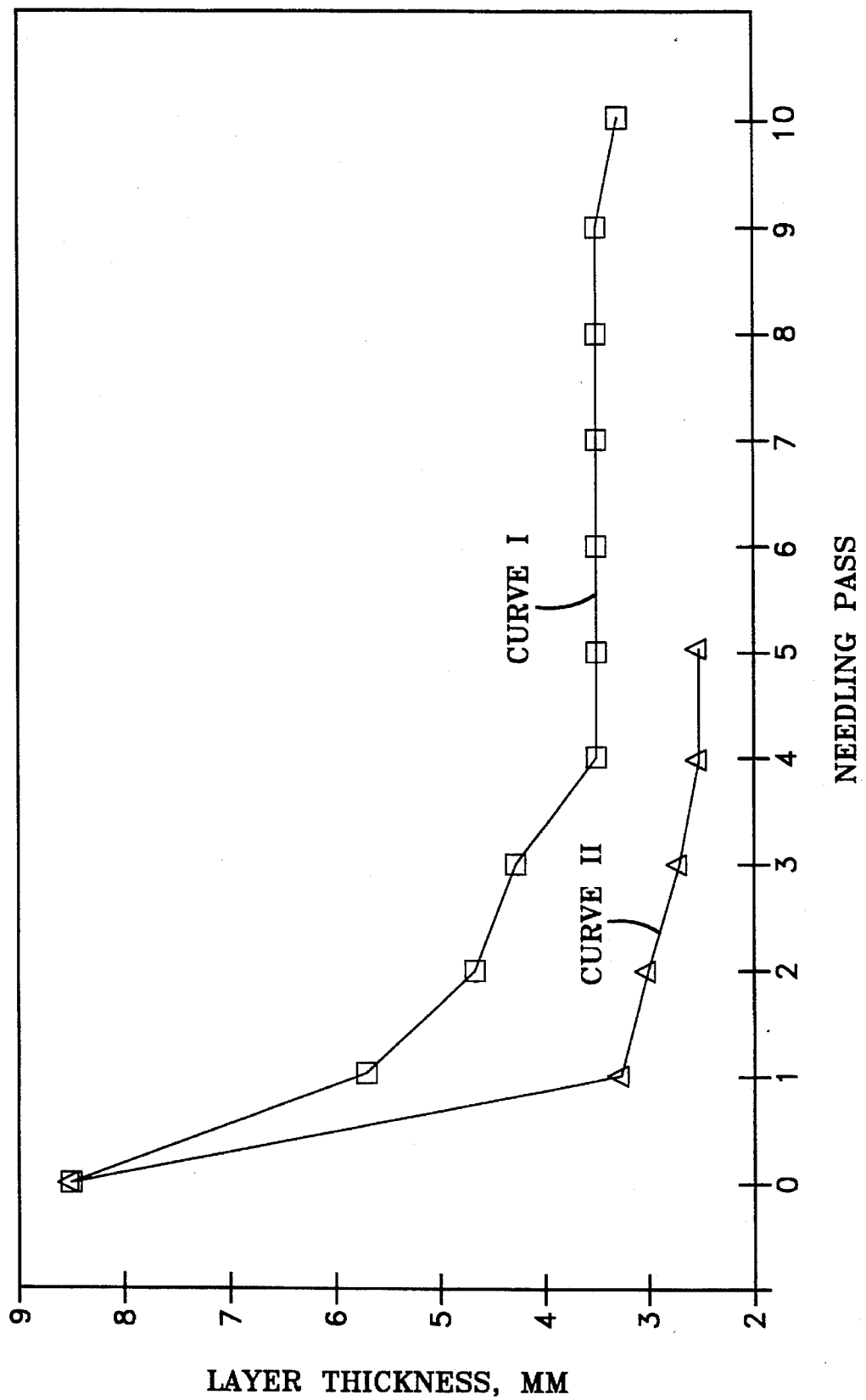
FIG. 10 depicts compaction curves showing layer thickness of an airlaid web versus number of needling passes according to an aspect of the invention.

The thickness of the individual layers may be used rather than the average layer thickness in the practice of the invention. The thickness of layer 128 for a series of needling passes (as shown in FIGS. 7A–7D) was determined by measuring a sliced-off portion of the fibrous structure following each needling pass, and is depicted in FIG. 10 as curve I beginning with the pre-needled thickness (before needling pass 1). Curve II represents the thickness of an airlaid web such as layer 128 when needled to a substantial fibrous structure at a later point in the process. Note that the airlaid web compacts much differently depending on the point in the process at which the layer is applied.

As shown in this FIG. 10, compaction of a thick layer such as layer 128 can continue for several needling passes. Failing to account for this compaction can cause a significant deviation from a desired Z-fiber distribution through the thickness of the fibrous preform structure. Characterizing individual layers is necessary if any of the layers are significantly different from other layers within the fibrous structure. Once again, a curve such as FIG. 10 may be determined during construction of a previously formed fibrous preform structure and used during formation of subsequently formed fibrous preform structures that are substantially similar. The curve should not change a significant amount from formation of one fibrous preform structure to the next as long as the processes are substantially similar.

More than one needling pass may permanently transport fiber from a given layer in the set of layers. Therefore, a technique is desired whereby a cumulative quantity of fiber permanently transported from a given layer may be determined. According to an aspect of the invention, each barb engages an amount of fiber from a given layer in the set of layers as each barb passes through that layer during a given needling pass. A quantity of fiber permanently transported from a given layer during the needling pass is approximated by summing each amount engaged from that layer by each barb that travels at least the minimum distance from that layer, as previously described. A cumulative quantity of fiber permanently transported from a given layer is approximated by summing the quantity from each needling step that permanently transports fiber from the layer. The cumulative quantity of fiber permanently transported from a given layer is conveniently approximated using a table such as that depicted in FIG. 11.

Figure 11:
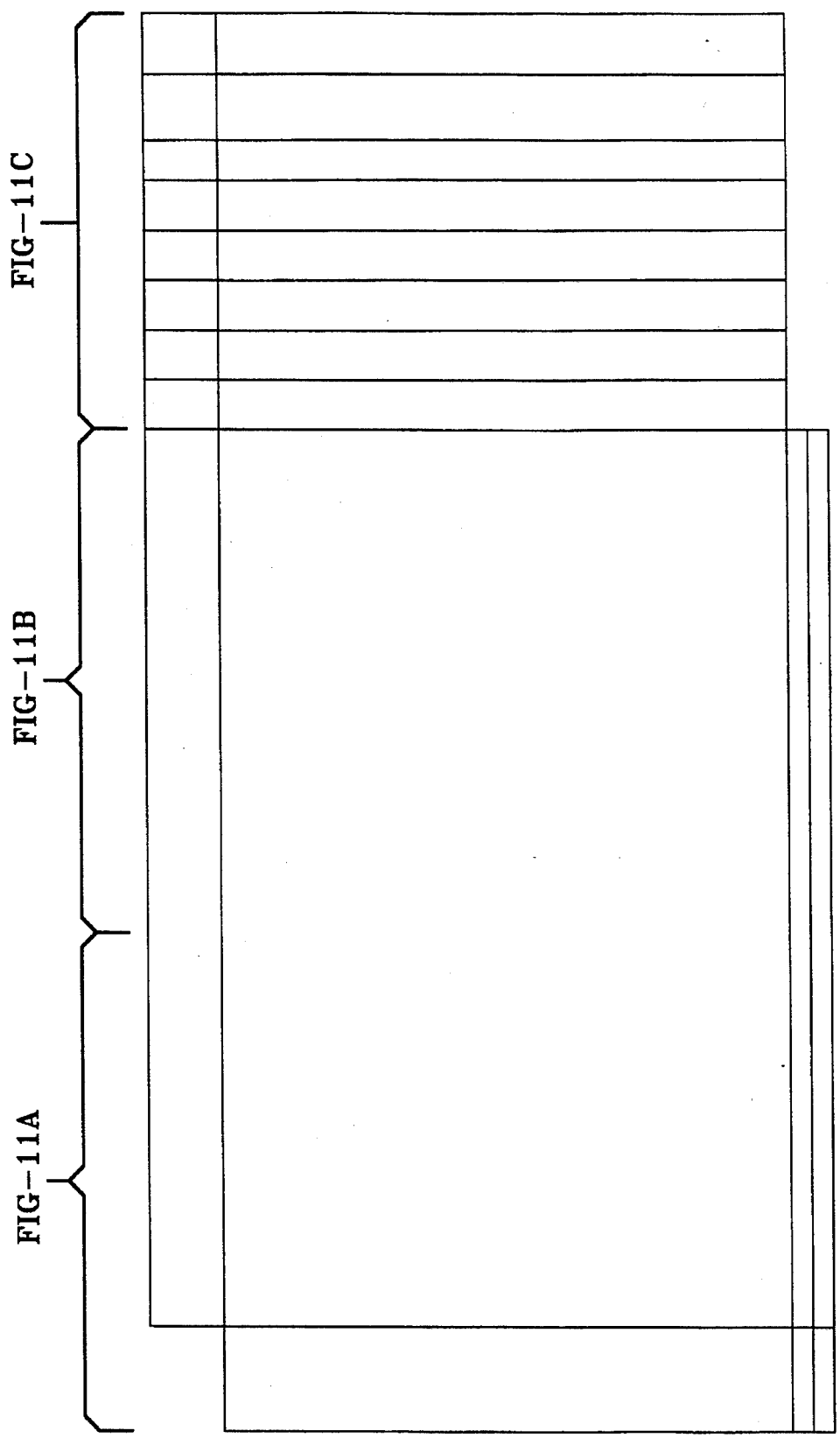
FIG. 11 depicts a schematic of a diagonal matrix for quantifying permanent fiber transport and determining a cumulative quantity of permanent transport for each layer according to an aspect of the invention.

In FIG. 11, needling pass is numbered along a vertical axis on the left side of the table. The layers comprising the fibrous structure for each needling pass are numbered along a horizontal axis at the top of the table. A total of 32 layers were needled together, beginning with layers 1 and 2 at needling pass 1. Layers 1 and 32 were 800 g/m² airlaid web and layers 2 through 31 each comprised three cross-lapped unidirectional sub-layers of OPF fiber needled together into a coherent layer, as previously described. A layer was added before each needling pass from needling pass 2 to needling pass 31, followed by three walkout needling passes WO1, WO2, and WO3 during which the fibrous structure was lowered and needled without adding layers. The bedplate position relative to the initial bedplate position at needling pass 1 is designated as "δ" in the first column on the right of the table. The change in bedplate position for each needling pass from the previous needling pass is shown in the column labeled "$\Delta^i-\delta^{i-1}$." As depicted in FIG. 2, the multitude of felting needles 14 were reciprocally driven through a fixed range of travel 160, and the fibrous structure was disposed on the bedplate 12 and moved in the direction of arrow 34. The vertical position of bedplate 12 was controlled such that moving the bedplate 12 toward the multitude of felting needles increased fiber transport depth and moving the bedplate away from the multitude of felting needles decreased fiber transport depth.

Figure 12:
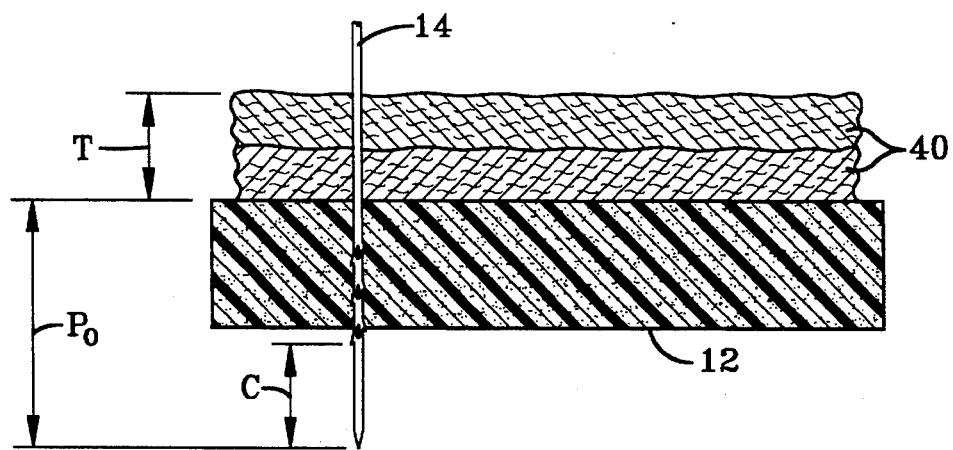
FIG. 12 depicts the relationship of certain variables to needling process geometry.

The total thickness of the fibrous structure after each needling pass is shown in the column labeled "T". A thickness of layer 1 (the airlaid web) was determined for each needling pass and is shown in the column labeled "$t_{air}$", and was determined for each needling pass by measuring sliced-off portions of the fibrous preform structure for each needling pass. It could also be determined from a previously established relationship as previously described in relation to FIG. 10. An average layer thickness $t_{ave}$, after needling, was determined for each needling pass by dividing T by the number of layers comprising the fibrous structure after subtracting the thickness of layer 1 (the airlaid web). The average layer thickness $t_{ave}$, is shown in the column labeled "$t_{ave}$." The transport depth $D1_1$ of the first barb relative to the top layer for each needling pass is shown in the column labeled "Actual $D1_1$" and was calculated according to the following equation:

$$D1_1 = P_o - c + T + F - \delta \qquad \text{Eqn. (7)}$$

wherein $D1_1$ is the transport depth of the first barb relative to the top layer, δ is the bedplate position relative to the initial bedplate position (a positive δ indicates a movement away from the needles), $P_o$ is the initial needle penetration depth when δ=0, T is total fibrous structure thickness after each needling pass, c is the distance between the first barb and the tip of the felting-needle, and F is the compaction factor. In FIG. 11, all lineal dimensions are in millimeters. Referring to FIG. 12, $P_o$ is defined as the distance between the tip of the needle and the top of the bedplate when δ=0 at the first needling pass. The distance c between the tip of the needle and the first barb is also depicted, as well as the total post-needled thickness of the fibrous structure T.

The compaction factor, F, was determined from FIG. 8 for each needling pass. Thus, the post-needled surface position for a given needling pass is determined from the bedplate position δ and post-needled thickness T, and the estimated surface position during needling is determined by adding the compaction factor F to that position.

For this needling process, the minimum distance to achieve permanent fiber transport was about .7 mm as determined according to the process described in relation to FIG. 4. Therefore, all three barbs had to travel at least 7 mm from the upper boundary of a given layer in order to permanently transport fiber engaged and transported from that layer by all three barbs. With the felting needle used in this process, the first barb is spaced 1.06 mm from the second barb, and the third barb is spaced 1.06 mm from the second barb. Therefore, the first barb had to travel at least 9.12 mm (7 mm+1.06 mm+1.06 mm) past the upper boundary of a given layer in order to achieve permanent transport of 100% of the fiber engaged by all three barbs from a given layer by the felting needles. In FIG. 11, it was assumed that the first barb transported 70% of the fiber, the second barb transported 25% of the fiber, and the third barb transported 5% of the fiber, as previously described. At this point, equations 1–6 could be used to calculate the quantity of permanent fiber transport from each layer for a given needling pass. However, the following table may be utilized to reduce the number calculations by focusing on transport depth of the first barb relative to each layer:

TABLE 1

| % Permanent Transport From a Given Layer n | Transport Depth of First Barb |
| --- | --- |
| 100 | $Dn_1 \geq 9.12$ |
| 95 | $9.12 > Dn_1 \geq 8.06$ |
| 70 | $8.06 > Dn_1 \geq 7.00$ |
| 25 | $7.00 > Dn_1 \geq 6.50$ |
| 0 | $Dn_1 < 6.50$ | wherein $Dn_1$ is calculated for each layer according to Equation 6. Table 1 eliminates the need to calculate the transport depths for each individual needle barb. In Equation 6, the average layer thickness $t_{ave}$ at a given needling pass was used for $t_n$ at that needling pass if layer n was a crosslap layer, and $t_{air}$ was used for $t_n$ if layer n was an airlay layer at each needling step.

Referring still to Table 1 and the first range of transport depth ($Dn \geq 9.12$), all three barbs penetrate far enough such that 100% of the fiber is permanently transported (70%+25%+5%). In the second range ($9.12 > D_n \geq 8.06$), only 95% of the fiber is permanently transported because only the first and second barbs penetrate far enough to permanently transport fiber. In the third range ($8.06 > D_n \geq 7.00$), only 70% of the fiber is permanently transported because only the first barb penetrates far enough to permanently transport fiber. These ranges are readily deduced from the previously disclosed needling conditions and fibrous layer materials of the FIG. 11 fibrous preform structure. The fourth range of 25% permanent transport reflects an in-between range where the top layer is partially, but not fully, tacked to the adjacent layer according to the FIG. 4 process. As noted in relation to FIG. 4, the top layer begins to tack at a transport depth of about 6.5 mm and fully tacks at about 7.0 mm. Thus, the transition from no tack to full tack for this process appears to occur with an increase of 0.5 mm in transport depth. Including the 25% range provides a lower increment in quantity of permanent fiber transport that reflects this transition range. A table such as Table 1 could be constructed for any needling process and type of fibrous layer. However, the invention is not limited to the Table 1 ranges since these principles may be applied to nearly any fibrous layer material and needling process.

Determining a cumulative quantity of permanent fiber transport according to the FIG. 11 process is demonstrated by the following example. In FIG. 11, $P_o$ is 10.60 mm and c is 6.36 mm. Needling pass number 5 has a transport depth $D1_1$ from the top layer of 13.51 mm as calculated according to Equation 7 (10.6 mm–6.36 mm+ 12.07 mm+1.0 mm–3.8 mm), which is greater than 9.12 mm which means that 100% of the fiber transported from the top layer, which is layer 6 for needling pass 5, is permanently transported. Thus, a "100" appears in layer 6 for needling pass 5. The transport depth $D2_1$ from layer 4 is 11.81 mm (13.51 mm–1.70 mm), which is greater than 9.12 mm which means that 100% of the fiber transported from layer 5 is permanently transported during needling pass 5. Thus, a "100" appears in the layer 5 column of needling pass 5. The transport depth $D3_1$ from layer 4 is 10.11 mm (13.51 mm–1.70 mm–1.70 mm), which is greater than 9.12 mm which means that 100% of the fiber transported from layer 4 is permanently transported during needling pass 5. Thus, a "100" appears in the layer 4 column of needling pass 5. The transport depth $D4_1$ from layer 3 is 8.41 mm (13.51 mm– 1.70 mm–1.70 mm–1.70 mm), which is less than 9.12 mm but is greater than 8.06 mm which means that 95% of the fiber transported from layer 3 is permanently transported during needling pass 5. Thus, a "95" appears in the layer 3 column of needling pass 5. The transport depth $D5_1$ from layer 4 is 6.71 mm (13.51 mm– 1.70 mm–1.70 mm–1.70 mm–1.70 mm), which is less than 7.0 mm but greater than 6.5 mm which means that 25% of the fiber transported from layer 2 is permanently transported. Thus, there were five layers in the set of layers at needling pass 5 (layers 2–6). These calculations are repeated for all the needling passes and the quantities of transport for each needling pass are entered into the table as described. After doing so, a cumulative quantity of fiber transport for each layer is calculated by summing all the quantities of permanent transport appearing in the column for each layer. For example, layer 4 is subjected to permanent transport quantified as 100 during needling pass 3, 100 during needling pass 4,100 during needling pass 5, 95 during needling pass 6, and 25 during needling pass 7 for a total of 420 that appears at the bottom of the matrix. The sum of the quantities of permanent fiber transport for each layer is called the cumulative quantity of permanent fiber transport (CQT). The CQT quantifies total permanent fiber transport from each layer when fiber is permanently transported from a layer by at least two needling passes.

The thickness of layer 1 was derived from Curve I of FIG. 10 and the thickness of layer 32 was derived from Curve II of FIG. 11 since both these layers were airlaid web. Note that these layers compact differently since they are added at different points in the process. Thus, the invention is flexible and able to compensate for variations in compaction characteristics that occur throughout the process.

The CQT for all the layers appears in a row along the bottom of the FIG. 11 matrix labeled "Actual CQT." Note that the CQT generally decreases from a high of 465 at layer 3 to a low of 200 at layer 32. When forming a brake disk, several layers are removed during and after the densification process resulting in two opposing wear surfaces spaced from each other. The CQT at both wear surfaces (WS) is presented in FIG. 11. The CQT at one surface is about twice the CQT at the other wear surface (420/220). This non-uniformity has been verified by interlaminar peel tests of the fibrous preform structure characterized by FIG. 11. The force necessary to peel layers apart decreases as CQT decreases which follows from the fact that the CQT quantifies the amount of Z-fiber permanently transported. A higher CQT indicates a higher quantity of Z-fiber, and Z-fiber is responsible for cohering the layers. Thus, more Z-fiber equates to a higher interlaminar peel force.

The process may be carried a step further wherein the needling process is manipulated to generate a chosen CQT for each layer. Choosing the CQT for each layer comprising the fibrous preform structure is a matter of preform design according to desired properties of the final fibrous preform structure, and is not part of the invention. Equation 8 as follows may be used to achieve a desired quantity of permanent transport for each layer:

$$\delta^i = P_0 - c + T^{i-1} + W^i - D1_1^i \qquad \text{Eqn. (8)}$$

wherein $\delta^i$ is $\delta$ for the current needling pass i, $T^{i-1}$ is the total thickness of the fibrous structure from the previous needling pass i−1, $W^i$ is a prediction factor, and $D1_1^i$ is the desired transport depth $D1_1$ for the current needling pass. The prediction factor $W^i$ is the sum of the projected thickness of the top layer following the current needling pass and the projected compaction factor for that needling pass.

Two approaches are possible using Equation 8 to achieve a desired CQT for each layer in a fibrous preform structure. In some cases, the transport depths $D1_1^i$ for each needling pass may be known that will generate a desired CQT for each layer. Matching the transport depths $D1_1^i$ during construction of a similar preform structure with the known transport depths $D1_1^i$ may generate a similar CQT for each layer. Establishing known transport depths that will generate a desired CQT for each layer may be accomplished, for example, by using Equation 7 and the principles discussed thus far in relation to the invention to characterize a fibrous preform structure formed by a particular process and to determine a transport depth for each needling pass, and a resulting CQT for each layer. A process for characterizing $D1_1$ for each needling pass and a CQT for each layer in a preform structure was previously described with great detail in relation to FIG. 11, and using Equation 7. An example of such information that may be obtained from a previously constructed fibrous preform structure is presented in the "Desired $D1_1$" column and the "Desired CQT" row of FIG. 11.

A preform structure having "Actual $D1_1$" transport depths and "Actual CQT" quantities substantially similar to the "Desired $D1_1$" transport depths and "Desired CQT" quantities may be constructed as follows. Equation 8 is used to calculate $\delta^i$ for each needling pass. First, the prediction factor $W^i$ must be determined According to a preferred embodiment, $W^i$ for a given needling pass (i) is derived from data obtained from the previous needling pass (i−1). More preferably, $W^i$ is derived by summing $t_{ave}^{i-1}$ and $F^{i-1}$ if the current layer (i) is substantially the same as the previous layer (i−1). Alternatively, layer thickness and F for a given needling pass may be derived by using curves such as those presented in FIGS. 8 and 10, especially if the layers are not substantially similar. Referring again to FIG. 11 and using needling pass 5 as an example, data from needling pass 4 was used to determine a $W^5$ of 2.91 mm for needling pass 5 by summing $F^4$ (1.0 mm) and $T_{ave}^4$ (1.91 mm). Thus, $\delta^5$ is 3.8 mm (10.6 mm− 6.36 mm+11.18 mm+2.91 mm−14.53 mm) for needling pass 5, according to Equation 8, and using the desired transport depth of 14.53 mm at needle pass 5 for $D1_1^5$. The support is then adjusted to a $\delta^5$ of 3.8 mm and the fibrous structure is subjected to needling pass 5.

Equation 8 may thus be used to calculate $\delta^i$ for each needling pass. The support is adjusted to that $\delta^i$ and the fibrous structure is subjected to that needling pass. After a given needling pass is performed, the fibrous layer thicknesses comprising the fibrous structure for that needling pass are determined, as previously described, and Equation 7 is used to establish the actual transport depth for that needling pass which serves to verify that the process is on track. The actual transport depth calculated for each needling pass appears in the column labeled "Actual $D1_1$", which has already been described in great detail.

Actual CQT versus desired CQT for this process is shown at the bottom of FIG. 11. The actual CQT is preferably within ±10% of the desired CQT at each needling pass. Constructing a preform according to this process allows the process to actively correct itself for any variations that occur during the process, and results in an actual Z-fiber distribution that closely approximates the desired Z-fiber distribution. Variations may arise from compaction and subtle changes in fibrous layer thickness during the process, and other sources.

Figure 13:
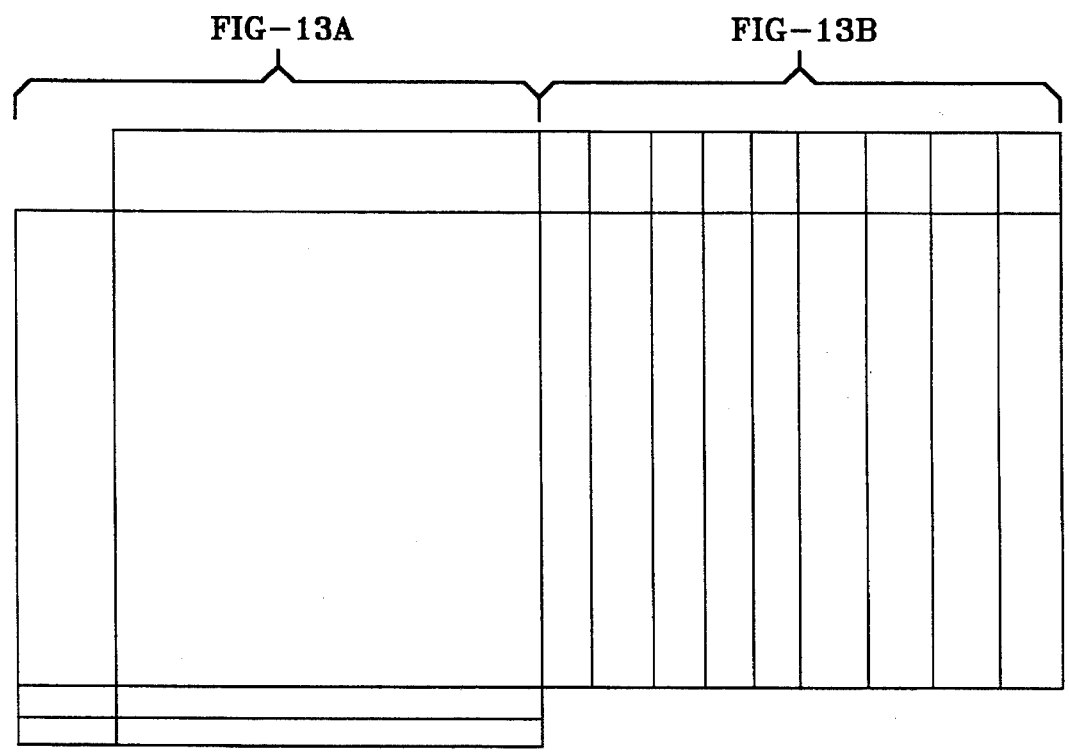
FIG. 13 depicts a schematic of a diagonal matrix for quantifying permanent fiber transport and for manipulating a cumulative quantity of permanent transport for each layer according to an aspect of the invention.

According to another approach that also represents an aspect of the invention, the quantity of permanent fiber transport of each layer may be manipulated at each needling pass to achieve a desired CQT for each layer. Referring to FIG. 13, a table is presented that was used to construct a fibrous preform structure having a substantially constant CQT value through a number of adjacent layers. In this example, a CQT value of 270 was desired for each layer, which appears in a row along the bottom of the table. The actual CQT for each layer is also depicted, and closely follows the desired CQT. Thirteen layers were needled together, each layer being comprised of three cross-lapped unidirectional sub-layers of OPF fiber needled together into a coherent layer, as previously described. The quantity of permanent transport from each layer for each needling pass was manipulated as follows.

The process began by needling layers 1 and 2 together by subjecting those layers to needling pass 1. Equation 7 was then used with appropriate measurements of the fibrous preform structure to calculate the actual $D1_1$ of 11.12 mm for needling pass 1, which appears in the furthest column to the right of FIG. 13. In this process, $P_o$ was 11.0 mm and c was 6.36 mm. The initial bedplate setting for needing pass 1 is a matter of judgment, and should be sufficient to cohere the layers. The initial bedplate position $\delta^1$ preferably results in an initial transport depth $D1_1^1$ that is reasonably deep enough to achieve 100% transport from layers 1 and 2 during needling pass 1 without over-needling the layers. As before, the column labeled "T" is the post-needled thickness of the preform, and the column labeled "$t_{ave}$" is the average layer thickness calculated by dividing T by the number of layers comprising the fibrous preform structured at each needling pass. The compaction factor, F, is derived from FIG. 6 and also appears in FIG. 13.

Beginning with needling pass 2, a desired transport depth $D1_1^2$ is determined that is sufficient to achieve a desired quantity of permanent fiber transport from each layer in a set of layers. The set of layers and the quantity for each layer are determined at each needling step as necessary to generate the desired CQT for each layer. At needling pass 2, for example, permanent transport from layer 3 should be 100% since layer 3 has not yet been needled and a CQT of 270 is desired, permanent transport from layer 2 should be 100% since layer 2 has a CQT of only 100 after needling pass 1 and a CQT of 270 is desired, and permanent transport from layer 1 should be 100% since layer 1 has a CQT of only 70 after needling pass 1 and a CQT of 270 is desired. The desired quantities may be arranged in a matrix such as that presented in FIG. 14A. The layer numbers from FIG. 13 appear in the first column of FIG. 14A. The second column, N, indicates a given layer in the set of layers as used in Equations 1 through 6. Note that the layer numbers of the first column do not match N because N is always 1 for the top layer in the set of layers. The desired quantity of transport from each layer appears in the next column. Finally, an estimated layer thickness for all but the lowest layer in the set of layers appears in the last column. According to a preferred embodiment, the average layer thickness from the previous needling step is used as the estimated layer thickness. Thus, 3.24 mm ($t_{ave}$ from needling pass 1) appears in the depth column for layers 2 (N=2) and 3 (N=1). A desired transport depth relative to the lowest layer in the set of layers is then determined and placed in the depth column of FIG. 14A for the lowest layer. In this example, this transport depth is $D3_1^2$ since N=3 for the lowest layer. According to a preferred embodiment, a table such as Table 1 is used to determine the desired transport depth. Using this table, $D3_1^2$ must be at least 9.12 mm in order to achieve 100% permanent transport from layer number 1 (N=3). The transport depth $D1_1^2$ relative to the top layer (N=1) is determined by summing the numbers that appear in the "Depth" column of FIG. 14A resulting in a desired value of 15.60 mm. The desired transport depth $D1_1$ for each needling pass appears in the "Desired $D1_1$" column of FIG. 13. The desired transport depth $D3_1$ for each needling pass appears in the "Desired $D3_1$" column of FIG. 13.

The estimated transport depth $D1_1^2$ was then used in Equation 8 to determine a bedplate setting for needling pass 2. According to a preferred embodiment, $W^i$ of Equation 8 is determined by summing $t_{ave}^{i-1}$ and $F^{i-1}$ as previously discussed in relation to FIG. 11 and Equation 8. For needling pass 2, $W^2$ is 3.24 mm, and $\delta^2$ is −1.2 mm (11.0 mm−6.36 mm+6.48 mm+3.24 mm− 15.60 mm). The support position $\delta^2$ is negative which indicates a movement toward the felting needles relative to the initial support position at needling pass 1. The support was adjusted to $\delta^2$ and the fibrous structure was subjected to needling pass 2.

After the needing pass, appropriate measurements were made and Equation 7 was used to calculate the actual transport depth $D1_1^2$ for the second needling pass, which was 14.61 mm. The actual transport depth $D1_1^i$ for each needling pass appears in the "Actual $D1_1$" column of FIG. 13. The actual quantities of permanent transport were then calculated and inserted in FIG. 13 according to previously described techniques. For needling pass 2, the desired transport depth was sufficient to achieve the desired quantities of 100% permanent fiber transport for all three layers. The actual transport depth $D3_1^i$ for each needling pass calculated according to Equation 6 appears in the "Actual $D3_1$" column of FIG. 13. The value for $D3_1^2$ of 9.37 mm verifies that 100% of the fiber transported from layer 1 (N=3) for needling pass 2 was permanently transported since this value is greater than 9.12 mm (see Table 1).

This process is repeated for each needling pass, examples of which appear in FIGS. 14B and 14C wherein desired transport depths $D1_1$ for needling passes 3 and 4 are determined. There are three layers in the set of layers, and the desired quantity of transport for the lowest layer (N=3) in the set of layers is 70% for the remainder of the needling passes since a uniform CQT of 270 is desired. The desired quantity of 70% for the lowest layer (N=3) was achieved by ensuring that $D3_1$ for each needling pass was between 7.00 and 8.06 mm, as required by Table 1. This was achieved by choosing a desired $D3_1$ of about 7.5 mm at each needling pass. However, this number may be shifted toward the lower limit or the upper limit depending on the transport depth trend evident from FIG. 13. For example, if it appears that the actual $D3_1$ is approaching 8.06 mm for a given needling pass, the desired $D3_1$ for the next needling pass may be shifted toward 7.00 mm (desired $D3_1 < 7.5$ mm). Likewise, if $D3_1$ is approaching 7.00 mm for a given needing pass, the desired value for the next pass may be shifted toward 8.06 mm (desired $D3_1 > 7.5$ mm). In such manner, transport depth may be adjusted to remain within the necessary limits to achieve the desired quantity of permanent fiber transport at each needling pass. The quantities of permanent fiber transport at each needling pass may thus be manipulated to achieve a desired CQT for each layer.

Still referring to FIG. 13, note that the actual CQT of 170 for layer 1 is significantly lower than the desired CQT of 270. Achieving the desired CQT for the first layer may be difficult, but is of little consequence since the first layer is usually removed during subsequent processing of the fibrous preform structure. The actual CQT closely tracks the desired CQT for layers 2 through 11. The actual CQT of layers 12 and 13 is low, but may be increased to the desired CQT during addition of subsequent layers, or by subjecting the fibrous structure to walkout needling passes without adding layers.

Variations are possible without departing from the invention. For example, the desired CQT of FIG. 13 was the same for each layer. However, the desired CQT distribution may change from one layer to the next. A fibrous preform structure having any such distribution may be achieved using the principles provided by this disclosure. Further, the projected layer thicknesses for determining $W^i$ and the fiber transport depth $D1_1^i$ for each needling pass were based on measurements from the previous needling pass. The projected layer thicknesses may be determined using other techniques, such as deriving them for a given needling pass from curves such as those presented in FIGS. 9 and 10. Similarly, $W^i$ may be determined for a given needling pass by measuring its value during formation of a substantially similar fibrous preform structure in a substantially similar process, or according to any other previously described or equivalent technique.

It is important to note that the effects of needling any given layer actually extend into several lower layers. In FIGS. 11 and 13, the layers through which the Z-fiber bundle actually passes at each needling step are indicated by dashed lines. Fractional entries indicate that fiber was transported through part of a layer during that needling step. Thus, needling of a subsequent layer increases the number of Z-fiber bundles in a lower layer. Increasing CQT for a subsequent layer increases the amount of Z-fibers in a lower previously needled layer.

FIGS. 6, 8, 9, 10, and 11 are based on actual thickness measurements of fibrous layers and fibrous preform structures. A small amount of deviation from one measurement to the next may be evident in those figures and is unavoidable. Measuring fibrous layer thickness and fibrous structure thickness accurately and repeatably is important in the practice of the invention. Measuring thickness according to ASTM D 1777-64 (reapproved 1975), "Standard Method for Measuring Textile Materials", is preferred.

The various aspects of the invention described herein may be applied independently of each other. For example, the method of quantifying and manipulating transport described herein may be utilized with fibrous layers that have little or no tendency to further compact after an initial needling pass, and with layers comprised of fibers that exhibit little or no tendency to pull back to the layer of origin. The method described herein for addressing layer compaction after an initial needling pass may be utilized without quantifying or manipulating transport, as described herein, and with fibrous layers comprised of fibers that exhibit little or no tendency to pull back to the layer of origin. The method described herein for addressing fiber pull back may be utilized without quantifying or manipulating transport, as described herein, and with fibrous layers that have little or no tendency to further compact after an initial needling pass. Further, various types of felting needles are known in the art. Any variation in felting needle is considered to be within the purview of the invention.

It is evident that many variations are possible without departing from the true scope and spirit of the invention as defined by the claims that follow.

We claim:

1. A process for forming a fibrous preform structure, comprising the steps of:

disposing a fibrous structure comprising a multitude of previously cohered fibrous layers beneath a multitude of felting needles, one of said layers being a top layer that defines an exposed surface, wherein fiber is to be transported within said fibrous structure during a needling pass in which said fibrous structure is passed beneath a multitude of felting needles while said multitude of felting needles are repeatedly driven into said fibrous structure through said exposed surface;

determining an estimated surface position of said exposed surface beneath said multitude of felting needles during said needling pass, wherein said exposed surface moves away from said needles during said needling pass due at least in part to compaction within said top layer;

determining a desired fiber transport depth relative to said estimated surface position; and, transporting fiber to said desired fiber transport depth by subjecting said fibrous structure to said needling pass.

2. The process of claim 1, wherein said exposed surface moves away from said needles during said needling process due at least in part to compaction within layers disposed beneath said top layer.

3. The process of claim 1, wherein said fibrous structure is to be subjected to multiple needling passes in which fiber is transported within said fibrous structure by at least two needling passes;

said step of determining a fiber transport depth comprises the step of determining a fiber transport depth for each needling pass; and said step of transporting fiber to a desired fiber transport depth comprises the step of subjecting said fibrous structure to said multiple needling passes.

4. The process of claim 3, wherein said exposed surface moves away from said needles during said needling process due at least in part to compaction within layers disposed beneath said top layer.

* * * * *